United States Patent
Xu et al.

(10) Patent No.: US 11,695,505 B2
(45) Date of Patent: *Jul. 4, 2023

(54) REDUCED OVERHEAD ERROR DETECTION CODE DESIGN FOR DECODING A CODEWORD

(71) Applicant: Qualcomm Incorporated, San Diego, CA (US)

(72) Inventors: Changlong Xu, Beijing (CN); Liangming Wu, Beijing (CN); Jian Li, Beijing (CN); Kai Chen, Shenzhen (CN); Jing Jiang, San Diego, CA (US); Gabi Sarkis, San Diego, CA (US); Hao Xu, Beijing (CN)

(73) Assignee: Qualcomm Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/500,347

(22) Filed: Oct. 13, 2021

(65) Prior Publication Data
US 2022/0094471 A1   Mar. 24, 2022

Related U.S. Application Data

(63) Continuation of application No. 16/763,304, filed as application No. PCT/CN2018/112208 on Oct. 26, 2018, now Pat. No. 11,171,739.

(30) Foreign Application Priority Data

Nov. 16, 2017   (WO) ................ PCT/CN2017/111321

(51) Int. Cl.
*H04L 1/00* (2006.01)
*H04L 1/1812* (2023.01)

(52) U.S. Cl.
CPC .......... *H04L 1/0052* (2013.01); *H04L 1/0041* (2013.01); *H04L 1/0061* (2013.01); *H04L 1/1812* (2013.01)

(58) Field of Classification Search
CPC ... H04L 1/0052; H04L 1/0041; H04L 1/0061; H04L 1/1812
See application file for complete search history.

(56) References Cited

U.S. PATENT DOCUMENTS 7,853,857 B2 * 12/2010 Buckley ................ H04L 1/0065
  714/755
8,205,143 B2 *  6/2012 Buckley ................ H03M 13/09
  714/755

(Continued)

FOREIGN PATENT DOCUMENTS

CN   101803265 A   8/2010
CN   105812107 A   7/2016

(Continued)

OTHER PUBLICATIONS

Ericsson., et al., "Details on Probabilities of Undetected TB Errors," 3GPP Draft; R1-074492, TSG-RAN WG1 #50bis, Oct. 12, 2007 (Oct. 12, 2007), 9 pages.

(Continued)

*Primary Examiner* — James M Perez
(74) *Attorney, Agent, or Firm* — Holland & Hart LLP

(57) ABSTRACT

Methods, systems, and devices for wireless communications are described. An encoder of a wireless device may receive a transport block (TB) for transmission and segment the transport block into a set of multiple, smaller data segments that respectively correspond to a plurality of code blocks of the TB. The encoder may generate a code block level (CB-level) error detection code (EDC) for a subset of the data segments. The encoder may generate a transport block-level (TB-level) EDC for the TB using the data segments.

(Continued)

Each of the code blocks (CBs) may be of the same size and may include one of the data segments. A subset of the CBs may include a data segment from the subset of the data segments and one of the CB-level EDCs. The remaining CBs that are not part of the subset may include a remaining data segments and the TB-level EDC.

28 Claims, 17 Drawing Sheets

(56) References Cited

U.S. PATENT DOCUMENTS

| | | | | |
|---|---|---|---|---|
| 8,266,513 | B2* | 9/2012 | Kim | H03M 13/09 |
| | | | | 714/801 |
| 8,327,234 | B2* | 12/2012 | Earnshaw | H03M 13/152 |
| | | | | 714/780 |
| 8,356,232 | B2* | 1/2013 | Blankenship | H03M 13/05 |
| | | | | 714/779 |
| 8,527,843 | B2* | 9/2013 | Ramesh | H04L 1/0051 |
| | | | | 714/776 |
| 8,555,148 | B2* | 10/2013 | Pi | H04L 1/0083 |
| | | | | 714/755 |
| 8,559,552 | B2* | 10/2013 | Wang | H04L 27/28 |
| | | | | 375/264 |
| 8,576,807 | B2* | 11/2013 | Malladi | H04L 1/04 |
| | | | | 370/335 |
| 8,774,310 | B2* | 7/2014 | Khan | H04L 25/03343 |
| | | | | 375/296 |
| 8,917,796 | B1* | 12/2014 | Mayrench | H04B 7/0697 |
| | | | | 375/267 |
| 9,337,871 | B2* | 5/2016 | Li | H03M 13/6516 |
| 9,553,706 | B2* | 1/2017 | Luo | H04W 24/02 |
| 9,596,017 | B1* | 3/2017 | Mayrench | H04L 5/0028 |
| 9,893,842 | B2* | 2/2018 | Eder | H04L 1/1812 |
| 9,966,973 | B2* | 5/2018 | Li | H03M 13/155 |
| 10,057,019 | B2* | 8/2018 | Jiang | H04L 1/0057 |
| 10,098,093 | B2* | 10/2018 | Ang | H04L 5/0055 |
| 10,110,349 | B2* | 10/2018 | Liu | H04L 1/0071 |
| 10,320,428 | B2* | 6/2019 | Sarkis | H04L 1/00 |
| 10,361,717 | B2* | 7/2019 | Ge | H03M 13/09 |
| 10,484,135 | B2* | 11/2019 | Mallik | H03M 13/2966 |
| 10,541,780 | B2* | 1/2020 | Mukkavilli | H04L 1/0045 |
| 10,554,224 | B2* | 2/2020 | Li | H03M 13/6356 |
| 10,581,462 | B2* | 3/2020 | Ge | H04L 1/0058 |
| 10,630,450 | B2* | 4/2020 | Sun | H04L 1/1812 |
| 10,686,469 | B2* | 6/2020 | Lou | H04L 1/0057 |
| 10,742,353 | B2* | 8/2020 | Lin | H04J 13/004 |
| 10,771,202 | B2* | 9/2020 | Yoshimura | H04L 1/0076 |
| 10,917,112 | B2* | 2/2021 | Ge | H03M 13/09 |
| 11,018,815 | B2* | 5/2021 | Yoshimura | H04L 5/0007 |
| 11,146,358 | B2* | 10/2021 | Laddu | H04W 72/042 |
| 11,165,541 | B2* | 11/2021 | Merlin | H04L 1/1816 |
| 11,171,739 | B2* | 11/2021 | Xu | H04L 1/0061 |
| 11,258,536 | B2* | 2/2022 | Myung | H03M 13/11 |
| 11,290,204 | B2* | 3/2022 | Yeo | H04L 1/0057 |
| 2006/0013168 | A1* | 1/2006 | Agrawal | H04B 7/2656 |
| | | | | 370/335 |
| 2008/0098273 | A1* | 4/2008 | Blankenship | H04L 1/0066 |
| | | | | 714/746 |
| 2008/0301536 | A1* | 12/2008 | Shin | H04L 1/0059 |
| | | | | 714/E11.001 |
| 2008/0310526 | A1* | 12/2008 | Maltsev | H04L 27/2634 |
| | | | | 375/260 |
| 2008/0316977 | A1* | 12/2008 | Malladi | H04L 1/04 |
| | | | | 370/335 |
| 2009/0077447 | A1* | 3/2009 | Buckley | H03M 13/09 |
| | | | | 714/757 |
| 2009/0077456 | A1* | 3/2009 | Pi | H04L 1/0083 |
| | | | | 714/E11.032 |
| 2009/0086849 | A1* | 4/2009 | Tsai | H04L 1/0067 |
| | | | | 375/295 |
| 2009/0304109 | A1* | 12/2009 | Kotecha | H04L 1/06 |
| | | | | 375/299 |
| 2010/0031117 | A1* | 2/2010 | Lee | H04L 1/06 |
| | | | | 714/752 |
| 2010/0202386 | A1 | 8/2010 | Takaoka et al. | |
| 2012/0079359 | A1* | 3/2012 | Buckley | H04L 1/0061 |
| | | | | 714/E11.032 |
| 2014/0341050 | A1* | 11/2014 | Luo | H04L 5/0053 |
| | | | | 370/252 |
| 2015/0249473 | A1* | 9/2015 | Li | H03M 13/6356 |
| | | | | 341/51 |
| 2015/0381209 | A1* | 12/2015 | Roh | H04L 1/1812 |
| | | | | 714/755 |
| 2016/0132384 | A1* | 5/2016 | Ko | G06F 12/0246 |
| | | | | 714/6.11 |
| 2016/0173232 | A1* | 6/2016 | Mallik | H04L 1/0045 |
| | | | | 714/800 |
| 2016/0191175 | A1* | 6/2016 | Hwang | H04L 1/0041 |
| | | | | 370/329 |
| 2016/0192383 | A1* | 6/2016 | Hwang | H04L 1/1845 |
| | | | | 370/330 |
| 2016/0218743 | A1* | 7/2016 | Li | H03M 13/2906 |
| 2016/0285589 | A1* | 9/2016 | Mukkavilli | H04L 1/0045 |
| 2016/0329995 | A1* | 11/2016 | Jiang | H04L 5/14 |
| 2017/0155405 | A1* | 6/2017 | Ge | H04L 1/0041 |
| 2017/0366199 | A1* | 12/2017 | Ge | H04L 1/0057 |
| 2017/0366299 | A1* | 12/2017 | Li | H04L 1/004 |
| 2018/0212624 | A1* | 7/2018 | Li | H03M 13/611 |
| 2018/0375634 | A1* | 12/2018 | Sun | H04L 1/0023 |
| 2019/0028229 | A1* | 1/2019 | Yeo | H04L 1/0058 |
| 2019/0165882 | A1* | 5/2019 | You | H04W 72/042 |
| 2019/0173499 | A1* | 6/2019 | Zheng | H04L 1/0067 |
| 2019/0190654 | A1* | 6/2019 | You | H04L 1/0069 |
| 2019/0312671 | A1* | 10/2019 | Lin | H04L 5/0044 |
| 2019/0312679 | A1* | 10/2019 | Jayasinghe | H04L 1/0063 |
| 2020/0014401 | A1* | 1/2020 | Ge | H04L 1/0041 |
| 2020/0028618 | A1* | 1/2020 | Peng | H04L 1/0057 |
| 2020/0112394 | A1* | 4/2020 | Mukkavilli | H04L 1/1812 |
| 2020/0154309 | A1* | 5/2020 | Takeda | H04W 28/06 |
| 2020/0186167 | A1* | 6/2020 | Noh | H04L 1/0041 |
| 2020/0213032 | A1* | 7/2020 | Yeo | H04W 28/06 |
| 2020/0228236 | A1* | 7/2020 | Xi | H04L 1/0071 |
| 2020/0235759 | A1* | 7/2020 | Ye | H03M 13/1105 |
| 2020/0236587 | A1* | 7/2020 | Kim | H04L 1/1614 |
| 2020/0244285 | A1* | 7/2020 | Kim | H03M 13/036 |
| 2020/0252954 | A1* | 8/2020 | Kim | H04W 72/1268 |
| 2020/0344016 | A1* | 10/2020 | Yoshimura | H04L 5/0007 |
| 2020/0351027 | A1* | 11/2020 | Hosseini | H03M 13/09 |
| 2020/0366409 | A1* | 11/2020 | Xu | H04L 1/0061 |
| 2020/0395957 | A1* | 12/2020 | Shin | H03M 13/116 |
| 2020/0396730 | A1* | 12/2020 | Kim | H04L 27/00 |
| 2020/0412482 | A1* | 12/2020 | Zhang | H04L 1/0052 |
| 2022/0094471 | A1* | 3/2022 | Xu | H04L 1/1812 |
| 2022/0149985 | A1* | 5/2022 | Myung | H04L 1/0057 |
| 2022/0286223 | A1* | 9/2022 | Yeo | H04W 72/12 |

FOREIGN PATENT DOCUMENTS

| | | |
|---|---|---|
| CN | 107196740 A | 9/2017 |
| EP | 1914896 A1 | 4/2008 |
| EP | 2922227 A1 | 9/2015 |
| WO | WO-2009003064 A2 | 12/2008 |

OTHER PUBLICATIONS

International Search Report and Written Opinion—PCT/CN2018/112208—ISA/EPO—dated Jan. 24, 2019
International Preliminary Report on Patentability—PCT/CN2017/111321, The International Bureau of WIPO—Geneva, Switzerland, dated May 28, 2020.
International Preliminary Report on Patentability—PCT/CN2018/112208, The International Bureau of WIPO—Geneva, Switzerland, dated May 28, 2020.
International Search Report and Written Opinion—PCT/CN2017/111321—ISA/EPO—dated Jun. 28, 2018.
Supplementary European Search Report—EP18878664—Search Authority—MUNICH—dated Jul. 7, 2021.

(56) References Cited

OTHER PUBLICATIONS

Partial European Search Report—EP22154987—Search Authority—Munich—dated Sep. 12, 2022.

\* cited by examiner

REDUCED OVERHEAD ERROR DETECTION CODE DESIGN FOR DECODING A CODEWORD

CROSS REFERENCE

The present Application for Patent is a continuation of U.S. patent application Ser. No. 16/763,304 by Xu et al., entitled "Reduced Overhead Error Detection Code Design For Decoding A Codeword" filed May 12, 2020, which is a 371 national phase filing of International Patent Application No. PCT/CN2018/112208 TO Xu et al, entitled "Reduced Overhead Error Detection Code Design For Decoding A Codeword," filed Oct. 26, 2018, which claims priority to International Patent Application No. PCT/CN2017/111321 to Xu et al., titled "Reduced Overhead Error Detection Code Design for Decoding a Codeword," filed Nov. 16, 2017, assigned to the assignee hereof, which is expressly incorporated herein by reference in its entirety.

BACKGROUND

The following relates generally to wireless communication, and more specifically to reduced overhead error detection code design for decoding a codeword.

Wireless communications systems are widely deployed to provide various types of communication content such as voice, video, packet data, messaging, broadcast, and so on. These systems may be capable of supporting communication with multiple users by sharing the available system resources (e.g., time, frequency, or power). Examples of such multiple-access systems include fourth generation (4G) systems such as a Long Term Evolution (LTE) systems or LTE-Advanced (LTE-A) systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

In some wireless communications systems, data may be transmitted to a target device according to a transport block (TB) arrangement, where a TB may include a plurality of code blocks (CBs). A transmitting device may generate and encode a TB for transmission to the target device via a wireless channel. Hybrid automatic repeat request (HARQ) feedback is one technique of increasing the likelihood that a TB is successfully received by the target device. HARQ may include a combination of error detection (e.g., using a cyclic redundancy check (CRC)), forward error correction (FEC), and retransmission (e.g., automatic repeat request (ARQ)). The target device for the data transmission may transmit acknowledgment (ACK) feedback for each TB that is successfully received, and negative-acknowledgment (NACK) feedback for each TB that is not successfully received. Some wireless communications systems may set transmission latency specifications, or block error ratio (BLER) specifications, or both, for certain types of communications, such as ultra-reliable low latency communications (URLLC). CRC overhead in a TB may be significant in conventional systems, and conventional systems may be unable to meet transmission latency specifications, or block error ratio (BLER) specifications, or both, for certain types of communications.

SUMMARY

The described techniques relate to improved methods, systems, devices, or apparatuses that support techniques for reducing error detection code overhead. Generally, the described techniques reduce error detection code overhead by generating code block level (CB-level) error detection codes (EDCs) for a subset of code blocks (CBs) in a transport block (TB) and a TB-level EDC for the TB, and generating a codeword using the CB-level EDCs and the TB-level EDC. The reduced EDC overhead may improve data throughput and reduce decoding latency at a receiver, and improve the likelihood of meeting transmission latency specifications, or block error ratio (BLER) specifications, or both, for certain types of communications, such as ultra-reliable low latency communications (URLLC).

In an example, an encoder of a wireless device may receive a TB for transmission and segment the TB into a set of multiple, smaller data segments. The encoder may generate a CB-level EDC for a subset of the data segments, and the CB-level EDCs and the data segments may be included in respective CBs that each may be the same size (e.g., each CB includes the same number of bits). The encoder may also generate a transport block-level (TB-level) EDC for the TB using the data segments.

A subset of the CBs may include a data segment from the subset of the data segments and one of the CB-level EDCs. The remaining one or more CBs that are not part of the subset may include a remaining one of the data segments and the TB-level EDC. The CB that includes the TB-level EDC may be the same length as the other CBs of the TB (e.g., CBs with a data segment and CB-level EDC). Based on each CB being the same length (e.g., including the same number of bits), the same codes may be applied for each CB, and a receiving device may use a common decoder for each CB of the TB.

Prior to communicating with the receiving device, the transmitting wireless device may signal to the receiving device a coding scheme being used (e.g., polar code being used to encode a TB), and which subset of the CBs in the TB include the CB-level EDC, and which one or more CBs in the TB includes the TB-level EDC. The transmitting wireless device may generate a codeword from the TB, the subset of the CB-level EDCs, and the TB-level EDC. The transmitting wireless device may, for example, encode the TB, the subset of the CB-level EDCs, and the TB-level EDC according to a polar code to generate the codeword, and modulate the codeword for transmission to the receiving device via a wireless channel.

The receiving device may receive, via the wireless channel, a signal that includes the modulated codeword. The receiving device may demodulate and decode the signal to obtain a candidate bit sequence, using, for example, a list decoding algorithm according to the same polar code used to generate the codeword. The receiving device may attempt to determine whether the candidate bit sequence passes each of CB-level and TB-level error detection. If it passes, the receiving device may obtain the TB from the candidate bit sequence and determine that the received TB is the same TB as sent by the transmitter.

To perform error detection, the receiving device may parse the candidate bit sequence into CBs and perform CB-level error detection on the subset of the CBs that include the CB-level EDC. For example, the receiving device may obtain a data segment and a received CB-level EDC from a particular CB, calculate a CB-level EDC from the data segment using the same algorithm as applied by the transmitting device, and determine whether the calculated CB-level EDC matches the received CB-level EDC.

If each data segment in the subset of CBs passes CB-level error detection, the receiving device may then check the TB-level EDC. If the TB-level EDC fails, but each CB-level EDC passes, the receiving device may determine that only the data segment associated with the TB-level EDC failed error detection, and the receiving device may request a retransmission of just the failed data segment.

If one or more of the CB-level EDCs fail error detection, the receiving device may request a retransmission of each data segment which failed error detection as well as the data segment in the CB that included the TB-level EDC. In some examples, the receiving device may perform an early termination of decoding the TB-level EDC and corresponding data segment based on a CB-level EDC failing error detection. Beneficially, the techniques described herein may reduce error detection overhead and reduce decoding complexity, to improve the likelihood of a communication meeting BLER and/or transmission latency specifications.

A method of wireless communication is described. The method may include segmenting a transport block into a plurality of data segments, generating a CB-level EDC for each data segment of a subset of the plurality of data segments, generating a TB-level EDC based at least in part on the plurality of data segments, generating a codeword based at least in part on the plurality of data segments, the CB-level EDCs for the subset of the plurality of data segments, and the TB-level EDC, and transmitting the codeword via a wireless channel.

An apparatus for wireless communication is described. The apparatus may include means for segmenting a transport block into a plurality of data segments, means for generating a CB-level EDC for each data segment of a subset of the plurality of data segments, means for generating a TB-level EDC based at least in part on the plurality of data segments, means for generating a codeword based at least in part on the plurality of data segments, the CB-level EDCs for the subset of the plurality of data segments, and the TB-level EDC, and means for transmitting the codeword via a wireless channel.

Another apparatus for wireless communication is described. The apparatus may include a processor, memory in electronic communication with the processor, and instructions stored in the memory. The instructions may be operable to cause the processor to segment a transport block into a plurality of data segments, generate a CB-level EDC for each data segment of a subset of the plurality of data segments, generate a TB-level EDC based at least in part on the plurality of data segments, generate a codeword based at least in part on the plurality of data segments, the CB-level EDCs for the subset of the plurality of data segments, and the TB-level EDC, and transmit the codeword via a wireless channel.

A non-transitory computer-readable medium for wireless communication is described. The non-transitory computer-readable medium may include instructions operable to cause a processor to segment a transport block into a plurality of data segments, generate a CB-level EDC for each data segment of a subset of the plurality of data segments, generate a TB-level EDC based at least in part on the plurality of data segments, generate a codeword based at least in part on the plurality of data segments, the CB-level EDCs for the subset of the plurality of data segments, and the TB-level EDC, and transmit the codeword via a wireless channel.

In some examples of the method, apparatus, and non-transitory computer-readable medium described herein, generating the codeword may include encoding the plurality of data segments, the CB-level EDCs, and the TB-level EDC using a polar code to obtain the codeword.

In some examples of the method, apparatus, and non-transitory computer-readable medium described herein, generating the CB-level EDC for each data segment of the subset of the plurality of data segments may include generating the CB-level EDC for each of the plurality of data segments other than an identified data segment of the plurality of data segments.

Some examples of the method, apparatus, and non-transitory computer-readable medium described herein may further include processes, features, means, or instructions for associating each data segment of the plurality of data segments with a respective code block of a plurality of code blocks, where an identified code block of the plurality of code blocks includes the identified data segment and the TB-level EDC.

In some examples of the method, apparatus, and non-transitory computer-readable medium described herein, each of the plurality of code blocks other than the identified code block may include a respective data segment of the plurality of data segments other than the identified data segment and a respective CB-level EDC of the CB-level EDCs.

In some examples of the method, apparatus, and non-transitory computer-readable medium described herein, each of the CB-level EDCs includes a first number of bits and the TB-level EDC includes a second number of bits that differs from the first number of bits.

In some examples of the method, apparatus, and non-transitory computer-readable medium described herein, at least one code block of a plurality of code blocks includes the TB-level EDC and a data segment of the plurality of data segments that may have fewer bits than at least one other data segment of the plurality of data segments.

Some examples of the method, apparatus, and non-transitory computer-readable medium described herein may further include processes, features, means, or instructions for receiving feedback indicating that at least one data segment of the plurality of data segments did not pass error detection. Some examples of the method, apparatus, and non-transitory computer-readable medium described herein may further include processes, features, means, or instructions for generating a second codeword based at least in part on the at least one data segment. Some examples of the method, apparatus, and non-transitory computer-readable medium described herein may further include processes, features, means, or instructions for transmitting the second codeword via the wireless channel.

Some examples of the method, apparatus, and non-transitory computer-readable medium described herein may further include processes, features, means, or instructions for processing a sequence of bits included in the feedback to determine which one or more of the plurality of data segments passed error detection and which one or more of the plurality of data segments did not pass error detection.

In some examples of the method, apparatus, and non-transitory computer-readable medium described herein, each of the CB-level EDCs may be a CB-level cyclic redundancy check (CRC) and the TB-level EDC may be a TB-level CRC.

A method of wireless communication is described. The method may include processing a signal including a codeword to obtain a candidate bit sequence, segmenting the candidate bit sequence into a plurality of code blocks that each includes a respective data segment of a plurality of data segments, identifying a first data segment of a first code block of the plurality of code blocks using a code block-level (CB-level) error detection code of the first code block, identifying a second data segment of a second code block of the plurality of code blocks using a CB-level error detection code of the second code block, generating a transport block (TB) by combining the first data segment and the second data segment, and performing a TB-level error detection determination of the first data segment and the second data segment of the TB block using a TB-level error detection code.

An apparatus for wireless communication is described. The apparatus may include a processor, memory in electronic communication with the processor, and instructions stored in the memory. The instructions may be operable to cause the processor to process a signal including a codeword to obtain a candidate bit sequence, segment the candidate bit sequence into a plurality of code blocks that each includes a respective data segment of a plurality of data segments, identify a first data segment of a first code block of the plurality of code blocks using a code block-level (CB-level) error detection code of the first code block, identifying a second data segment of a second code block of the plurality of code blocks using a CB-level error detection code of the second code block, generate a transport block (TB) by combining the first data segment and the second data segment, and perform a TB-level error detection determination of the first data segment and the second data segment of the TB block using a TB-level error detection code.

Another apparatus for wireless communication is described. The apparatus may include means for processing a signal including a codeword to obtain a candidate bit sequence, segmenting the candidate bit sequence into a plurality of code blocks that each includes a respective data segment of a plurality of data segments, identifying a first data segment of a first code block of the plurality of code blocks using a code block-level (CB-level) error detection code of the first code block, identifying a second data segment of a second code block of the plurality of code blocks using a CB-level error detection code of the second code block, generating a transport block (TB) by combining the first data segment and the second data segment, and performing a TB-level error detection determination of the first data segment and the second data segment of the TB block using a TB-level error detection code.

A non-transitory computer-readable medium for wireless communication is described. The non-transitory computer-readable medium may include instructions operable to cause a processor to process a signal including a codeword to obtain a candidate bit sequence, segment the candidate bit sequence into a plurality of code blocks that each includes a respective data segment of a plurality of data segments, identify a first data segment of a first code block of the plurality of code blocks using a code block-level (CB-level) error detection code of the first code block, identifying a second data segment of a second code block of the plurality of code blocks using a CB-level error detection code of the second code block, generate a transport block (TB) by combining the first data segment and the second data segment, and perform a TB-level error detection determination of the first data segment and the second data segment of the TB block using a TB-level error detection code.

In some examples of the method, apparatus, and non-transitory computer-readable medium described herein, performing the TB-level error detection determination may include determining that the first data segment and the second data segment passed error detection based at least in part on determining that CB-level error detection determinations associated with the first code block and the second code block and the TB-level error detection determination do not indicate an error.

In some examples of the method, apparatus, and non-transitory computer-readable medium described herein, performing a TB-level error detection determination may include setting the TB-level error detection determination to indicate that an error was identified based at least in part on determining that at least one of CB-level error detection determinations associated with the first code block and the second code block indicates an error.

Some examples of the method, apparatus, and non-transitory computer-readable medium described herein may further include processes, features, means, or instructions for transmitting feedback indicating that at least one of the first data segment and the second data segment did not pass error detection based at least in part on CB-level error detection determinations associated with the first code block and the second code block.

In some examples of the method, apparatus, and non-transitory computer-readable medium described herein, performing a TB-level error detection determination may include determining that none of a set of CB-level error detection determinations associated with the first code block and the second code block indicate an error, and performing an error detection algorithm on the first data segment and the second data segment to generate the TB-level error detection determination. In some examples of the method, apparatus, and non-transitory computer-readable medium described herein, performing the error detection algorithm may include transmitting feedback indicating that the error detection algorithm detected a TB-level error. In some examples of the method, apparatus, and non-transitory computer-readable medium described herein, performing the error detection algorithm may include determining that the error detection algorithm did not detect a TB-level error, and transmitting feedback indicating that the first data segment and the second data segment passed error detection. In some examples of the method, apparatus, and non-transitory computer-readable medium described herein, processing the signal comprising the codeword to obtain the candidate bit sequence may include performing a list decoding algorithm to decode the codeword according to a polar code to generate the candidate bit sequence.

Some examples of the method, apparatus, and non-transitory computer-readable medium described herein further include generating a calculated CB-level error detection code (EDC) for the first data segment, obtaining a received CB-level EDC from the first code block, and comparing the calculated CB-level EDC and the received CB-level EDC, wherein CB-level error detection determination for the first code block indicates whether the calculated CB-level EDC matches the received CB-level EDC. In some examples of the method, apparatus, and non-transitory computer-readable medium described herein, performing the TB-level error detection determination may include generating a calculated TB-level error detection code (EDC) based at least in part on the first data segment and the second data segment, obtaining a received TB-level EDC from the second code block, and comparing the calculated TB-level EDC and the received TB-level EDC, wherein the TB-level error detection determination indicates whether the calculated TB-level EDC matches the received TB-level EDC.

A method of wireless communication is described. The method may include processing a signal including a codeword to obtain a candidate bit sequence, segmenting the candidate bit sequence into a plurality of code blocks that each includes a respective data segment of a plurality of data segments, generating a CB-level error detection determination for each code block of a subset of the plurality of code blocks, generating a TB-level error detection determination associated with the plurality of data segments, and generating an error detection determination associated with the plurality of data segments based at least in part on the CB-level error detection determinations and the TB-level error detection determination.

An apparatus for wireless communication is described. The apparatus may include means for processing a signal including a codeword to obtain a candidate bit sequence, means for segmenting the candidate bit sequence into a plurality of code blocks that each include a respective data segment of a plurality of data segments, means for generating a CB-level error detection determination for each code block of a subset of the plurality of code blocks, means for generating a TB-level error detection determination associated with the plurality of data segments, and means for generating an error detection determination associated with the plurality of data segments based at least in part on the CB-level error detection determinations and the TB-level error detection determination.

Another apparatus for wireless communication is described. The apparatus may include a processor, memory in electronic communication with the processor, and instructions stored in the memory. The instructions may be operable to cause the processor to process a signal including a codeword to obtain a candidate bit sequence, segment the candidate bit sequence into a plurality of code blocks that each include a respective data segment of a plurality of data segments, generate a CB-level error detection determination for each code block of a subset of the plurality of code blocks, generate a TB-level error detection determination associated with the plurality of data segments, and generate an error detection determination associated with the plurality of data segments based at least in part on the CB-level error detection determinations and the TB-level error detection determination.

A non-transitory computer-readable medium for wireless communication is described. The non-transitory computer-readable medium may include instructions operable to cause a processor to process a signal including a codeword to obtain a candidate bit sequence, segment the candidate bit sequence into a plurality of code blocks that each include a respective data segment of a plurality of data segments, generate a CB-level error detection determination for each code block of a subset of the plurality of code blocks, generate a TB-level error detection determination associated with the plurality of data segments, and generate an error detection determination associated with the plurality of data segments based at least in part on the CB-level error detection determinations and the TB-level error detection determination.

In some examples of the method, apparatus, and non-transitory computer-readable medium described herein, generating the error detection determination associated with the plurality of data segments may include determining that the plurality of data segments passed error detection based at least in part on determining that each of the CB-level error detection determinations and the TB-level error detection determination do not indicate an error.

In some examples of the method, apparatus, and non-transitory computer-readable medium described herein, generating the TB-level error detection determination may include setting the TB-level error detection determination to indicate that an error was identified based at least in part on determining that at least one of the CB-level error detection determinations indicate an error.

Some examples of the method, apparatus, and non-transitory computer-readable medium described herein may further include processes, features, means, or instructions for transmitting feedback indicating that one or more of the plurality of data segments did not pass error detection based at least in part on the CB-level error detection determinations.

In some examples of the method, apparatus, and non-transitory computer-readable medium described herein, generating the TB-level error detection determination may include determining that none of the CB-level error detection determinations indicate an error. Some examples of the method, apparatus, and non-transitory computer-readable medium described herein may further include processes, features, means, or instructions for performing an error detection algorithm on the plurality of data segments to generate the TB-level error detection determination.

In some examples of the method, apparatus, and non-transitory computer-readable medium described herein, performing the error detection algorithm may include transmitting feedback indicating that the error detection algorithm detected a TB-level error.

In some examples of the method, apparatus, and non-transitory computer-readable medium described herein, performing the error detection algorithm may include determining that the error detection algorithm did not detect a TB-level error. Some examples of the method, apparatus, and non-transitory computer-readable medium described herein may further include processes, features, means, or instructions for transmitting feedback indicating that the plurality of data segments passed error detection.

In some examples of the method, apparatus, and non-transitory computer-readable medium described herein, processing the signal including the codeword to obtain the candidate bit sequence may include performing a list decoding algorithm to decode the codeword according to a polar code to generate the candidate bit sequence.

In some examples of the method, apparatus, and non-transitory computer-readable medium described herein, generating the CB-level error detection determination for each code block of the subset of the plurality of code blocks may include obtaining a first data segment of the plurality of data segments from a first code block of the plurality of code blocks. Some examples of the method, apparatus, and non-transitory computer-readable medium described herein may further include processes, features, means, or instructions for generating a calculated CB-level EDC for the first data segment. Some examples of the method, apparatus, and non-transitory computer-readable medium described herein may further include processes, features, means, or instructions for obtaining a received CB-level EDC from the first code block. Some examples of the method, apparatus, and non-transitory computer-readable medium described herein may further include processes, features, means, or instructions for comparing the calculated CB-level EDC and the received CB-level EDC, where the CB-level error detection determination for the first code block indicates whether the calculated CB-level EDC matches the received CB-level EDC.

In some examples of the method, apparatus, and non-transitory computer-readable medium described herein, generating the TB-level error detection determination may include generating a calculated TB-level EDC based at least in part on the plurality of data segments. Some examples of the method, apparatus, and non-transitory computer-readable medium described herein may further include processes, features, means, or instructions for obtaining a received TB-level EDC from an identified code block of the plurality of code blocks. Some examples of the method, apparatus, and non-transitory computer-readable medium described herein may further include processes, features, means, or instructions for comparing the calculated TB-level EDC and the received TB-level EDC, where the TB-level error detection determination indicates whether the calculated TB-level EDC matches the received TB-level EDC.

DETAILED DESCRIPTION

Figure 1:
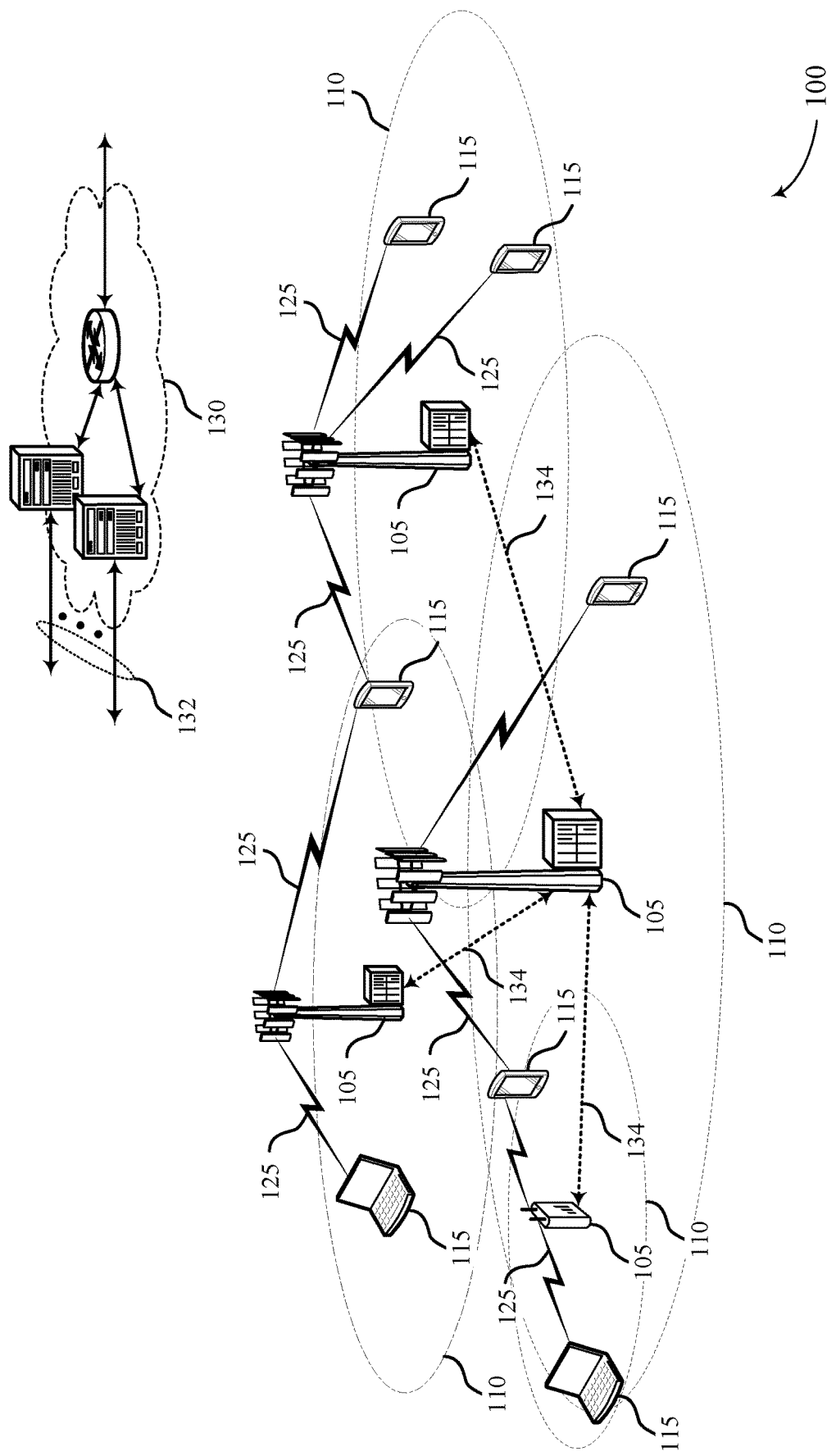
FIG. 1 illustrates an example of a wireless communications system that supports a reduced overhead error detection code (EDC) design for decoding a codeword in accordance with aspects of the present disclosure.

The described techniques relate to improved methods, systems, devices, or apparatuses that support techniques for reducing error detection code overhead. Generally, the described techniques reduce error detection overhead by generating code block level (CB-level) error detection codes (EDCs) for a subset of code blocks (CBs) in a transport block (TB) and a TB-level EDC for the TB, and generating a codeword using the CB-level EDCs and the TB-level. The reduced EDC overhead may improve data throughput and reduce decoding latency at a receiver, and improve the likelihood of meeting transmission latency specifications (e.g., 0.5 ms for uplink and downlink transmissions), or block error ratio (which may also be referred to as block error rate) (BLER) specifications (e.g., $10^{-5}$ BLER, $10^{-9}$ BLER, etc.), or both, for certain types of communications, such as ultra-reliable low latency communications (URLLC).

CRC overhead in a TB may be significant in conventional systems, which may reduce data throughput and increase transmission latency. By generating a CB-level EDC for only a subset of the plurality of data segments, a transmitting device as described herein may reduce CRC overhead experienced by conventional systems. In an example, an encoder of a wireless device may receive a TB for transmission and segment the TB into a set of multiple, smaller data segments. The encoder may generate a CB-level EDC for a subset of the data segments, and the CB-level EDCs and the data segments may be included in respective CBs that are each the same size (e.g., each CB includes the same number of bits). The encoder may also generate a transport block-level (TB-level) EDC for the TB using the data segments.

A subset of the CBs may include a data segment from the subset of the data segments and one of the CB-level EDCs. The remaining one or more CBs that are not a part of the subset may include a remaining one of the data segments and the TB-level EDC. EDC overhead may be reduced by at least one CB-level EDC, as the one or more CBs that are not part of the subset may not also include a CB-level EDC. The CB that includes the TB-level EDC may be the same length as the other CBs of the TB (e.g., CBs with a data segment and a CB-level EDC). Thus, the same codes may be applied for each CB of the TB.

Prior to communicating with the receiving device, the transmitting wireless device may signal to the receiving device a coding scheme being used (e.g., a polar code being used to encode a TB), and which subset of the CBs in the TB include the CB-level EDC, and which one or more CBs in the TB include the TB-level EDC. The transmitting wireless device may generate a codeword from the TB, the subset of the CB-level EDCs, and the TB-level EDC. The transmitting wireless device may, for example, encode the TB, the subset of the CB-level EDC, and the TB-level EDC according to the polar code to generate the codeword, and modulate the codeword for transmission to a receiving wireless device via a wireless channel.

The receiving wireless device may receive, via the wireless channel, a signal that includes the modulated codeword. The receiving device may demodulate and decode the signal to obtain a candidate bit sequence, using, for example, a list decoding algorithm according to the same polar code used to generate the codeword. The receiving device may attempt to determine whether the candidate bit sequence passes error detection. If the candidate bit sequence passes, the receiving device may obtain the TB from the candidate bit sequence and determine that the received TB is the same TB as sent by the transmitting device.

To perform error detection, the receiving device may parse the candidate bit sequence into bit subsequences having a same length as the length of the CBs, and perform CB-level error detection on the bit subsequences, which may include a data segment and a CB-level EDC, or a data segment and a TB-level EDC. In some cases, the receiving device may identify a first data segment of a first CB of the CBs using a CB-level error detection code of the first CB. The receiving device may also identify a second data segment of a second CB of the CBs using a CB-level detection code of the second CB. If each data segment in a subset of the CBs passes CB-level error detection, the receiving device may then check the TB-level EDC and corresponding data segment. In some cases, the receiving device may generate a TB by combining the first data segment and the second data segment, and perform a TB-level error detection determination of the first data segment and the second data segment of the TB using a TB-level error detection code.

In some cases, the receiving device may determine that the first data segment and the second data segment passed error detection based at least in part on determining CB-level error detection determinations associated with the first CB and second CB and the TB-level error detection determination do not indicate an error. In some cases, the receiving device may set the TB-level error detection determination to indicate that an error was identified based on determining that at least one of the CB-level error detection determinations associated with the first CB and the second CB indicates an error. In some cases, the receiving device may determine that none of the CB-level error detection determinations associated with the first CB and the second CB indicate an error, and the receiving device may perform an error detection algorithm on the first data segment and the second data segment to generate the TB-level error detection determination.

In some cases, the receiving device may generate a calculated TB-level EDC based at least in part of the first data segment and the second data segment, obtain a received TB-level EDC from the second CB, and compare the calculated TB-level EDC and the received TB-level EDC, where the TB-level detection determination indicates whether the calculated TB-level EDC matches the received TB-level EDC. If error detection for the TB-level EDC fails, but each CB-level EDC passes, the receiving device may request a retransmission for the data segment associated with the TB-level EDC and none of the other data segments. The receiving device may then transmit feedback requesting a retransmission of the unsuccessfully received data segment.

If one or more of the CB-level EDCs fail, the receiving device may request a retransmission of each data segment which failed error detection as well as the data segment associated with the TB-level EDC. In some examples, the receiving device may perform an early termination of decoding the TB-level EDC and corresponding data segment based on a CB-level EDC failing error detection. Beneficially, the techniques described herein may reduce error detection overhead and reduce decoding complexity, to improve the likelihood of a communication meeting BLER and/or transmission latency specifications.

Aspects of the disclosure are initially described in the context of a wireless communications system. Aspects of the disclosure are further illustrated by and described with reference to apparatus diagrams, system diagrams, and flowcharts that relate to reduced overhead EDC design for decoding a codeword.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions, from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 25 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency-division multiplexing (OFDM) or DFT-s-OFDM).

The organizational structure of the carriers may be different for different radio access technologies (e.g., LTE, LTE-A, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may include one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

An encoder of a transmitting wireless device, such as a base station 105 or a UE 115, may segment a TB into multiple, smaller data segments. The encoder may generate a CB-level EDC for some of the data segments. The encoder may generate a TB-level EDC for the TB, and the TB-level EDC may be included in a CB with at least one of the data segments. EDC overhead may be reduced by at least one CB-level EDC, as the data segment with the TB-level EDC may not also include a CB-level EDC.

The transmitting wireless device may generate a codeword from the CBs and modulate the codeword for transmission to a receiving device. The receiving wireless device may demodulate and decode the signal to obtain a candidate bit sequence. The receiving wireless device may determine, on a CB by CB basis, whether each data segment has been successfully received based on a CB-level EDC included in a corresponding CB. In some cases, the receiving wireless device may identify a first data segment of a first CB of the CBs using a CB-level error detection code of the first CB. The receiving wireless device may also identify a second data segment of a second CB of the CBs using a CB-level detection code of the second CB. If each data segment passes error detection, the receiving wireless device may check the TB-level EDC. In some cases, the receiving wireless device may generate a TB by combining the first data segment and the second data segment, and perform a TB-level error detection determination of the first data segment and the second data segment of the TB using a TB-level error detection code.

In some cases, the receiving wireless device may determine that the first data segment and the second data segment passed error detection based on determining CB-level error detection determinations associated with the first CB and second CB and the TB-level error detection determination do not indicate an error. In some cases, the receiving wireless device may set the TB-level error detection determination to indicate that an error was identified based on determining that at least one of CB-level error detection determinations associated with the first CB and the second CB indicates an error. In some cases, the receiving device may determine that none of CB-level error detection determinations associated with the first CB and the second CB indicate an error, and perform an error detection algorithm on the first data segment and the second data segment to generate the TB-level error detection determination. In some cases, the receiving device may generate a calculated TB-level EDC based at least in part of the first data segment and the second data segment, obtain a received TB-level EDC from the second CB, and compare the calculated TB-level EDC and the received TB-level EDC, where the TB-level detection determination indicates whether the calculated TB-level EDC matches the received TB-level EDC. The receiving wireless device may request retransmission for one or more of the data segments that did not pass error detection, up to all data segments of a TB. In some cases, the receiving wireless device may perform an early termination of decoding the TB-level EDC and corresponding data segment based on a CB-level EDC failing error detection.

Figure 2:
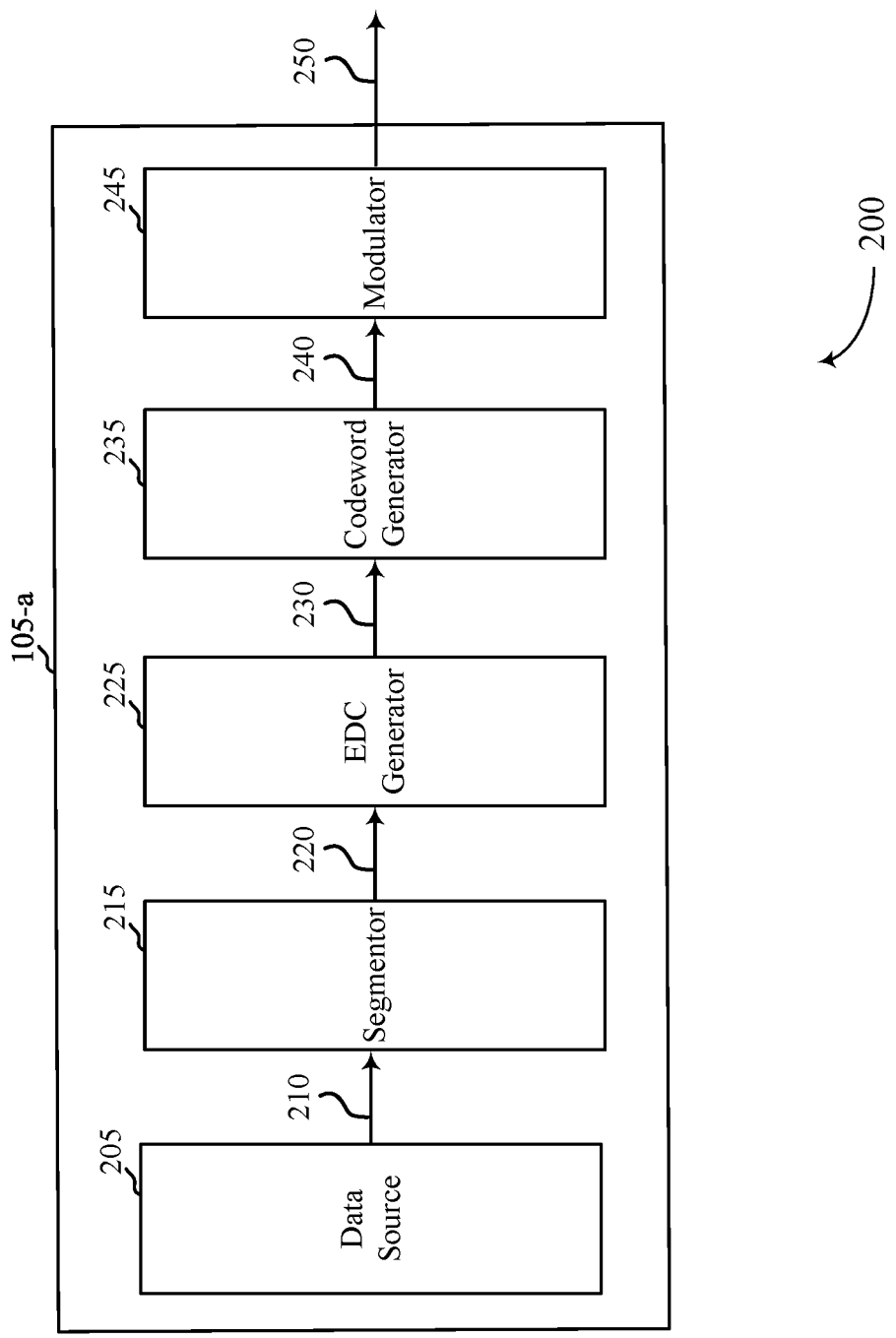
FIG. 2 illustrates an example of a wireless communications system that supports a reduced overhead EDC design for decoding a codeword in accordance with aspects of the present disclosure.

FIG. 2 illustrates an example of a wireless communications system 200 that supports a reduced overhead error detection code design for decoding a codeword in accordance with various aspects of the present disclosure. In some examples, wireless communications system 200 may implement aspects of wireless communications system 100. Wireless communications system 200 may include base station 105-a, which may be an example of a base station 105 as described with reference to FIG. 1.

Base station 105-a may encode a TB that includes a set of information bits for transmission to a UE 115-a (see FIG. 3) via a wireless communication channel. In other examples, a UE 115-a may encode a TB for transmission to base station 105-a or another UE using these same techniques. In further examples, base station 105-a may encode a TB for transmission to another base station 105-a using these same techniques. Moreover, devices other than base station 105-a and UE 115-a may use the techniques described herein.

In the depicted example, base station 105-a may include a data source 205, a segmentor 215, an EDC generator 225, a codeword generator 235, and a modulator 245. The data source 205 may provide a TB 210 that includes a set of s information bits to be encoded and transmitted to the UE 115-a. The data source 205 may be coupled to a network, a storage device, or the like. The data source 205 may output the TB 210 to the EDC generator 225. The segmentor 215 may segment the TB 210 into multiple data segments that each include the same number of bits, or at least one of the data segments may have a different number of bits than the other data segments. Segmentation may be an efficient way to meet latency and/or BLER specifications imposed by the wireless communications system 200. In some examples, polar codes may have better performance for payload sizes of less than a defined number of bits (e.g., 300 bits) compared with low-density parity-check (LDPC) codes and Turbo codes. Further, decoding latency may be decreased by reducing a total number of information bits and parity bits in a CB (e.g., by reducing a mother code size (e.g., CB size having a power of two)) by segmenting the TB 210 into smaller data segments that are respectively included in CBs of the TB 210. The segmentor 215 may pass the plurality of data segments 220 to the EDC generator 225.

EDC generator 225 may apply an error detecting algorithm to data segments 220 of the TB for generation of CB-level and TB-level EDCs. An EDC may be a code to enable the receiving device to detect an error in a received TB due to, for example, corruption from noise in a wireless channel. In an example, the EDC algorithm may be a CRC algorithm, and the EDC may be a CRC.

The EDC generator 225 may apply the error detecting algorithm to a subset of the data segments 220 to generate a CB-level EDC for each data segment in the subset of data segments 220. For example, the TB 210 may include N data segments corresponding to N CBs, where N is a positive integer. The subset of data segments 220 may include up to N−1 of the N data segments. EDC generator 225 may generate a CB-level EDC for each CB based on the corresponding data segment in the subset of the data segments. For example, a first CB may include a first data segment, and the EDC generator 225 may apply an error detecting algorithm to the first data segment to generate a CB-level EDC for the first CB. The EDC generator 225 may similarly generate a CB-level EDC for the remaining CBs in the subset of the CBs. The EDC generator 225 may also apply an error detection algorithm as a function of up to all of the data segments of the TB 210 to generate a TB-level EDC for the TB 210.

The EDC generator 225 may form each CB by appending an EDC to one of the data segments of the TB. A subset of the CBs may each include one of the data segments and a CB-level EDC. At least one of the CBs may include a data segment and a TB-level EDC. For example, the EDC generator 225 may generate a subset of CBs that each include a CB-level EDC for each data segment, and a last CB may include a data segment and the TB-level EDC.

Figure 4:
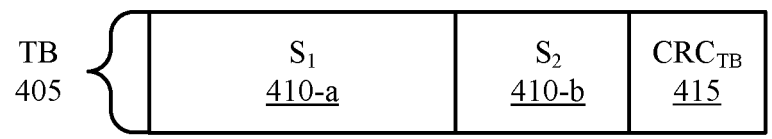
FIG. 4 illustrates an example of an EDC design that supports a reduced overhead EDC design for decoding a codeword in accordance with aspects of the present disclosure.
Figure 4:
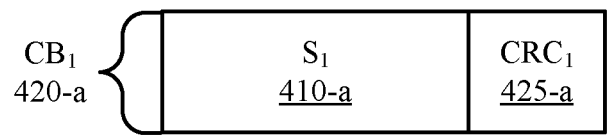
Figure 4:
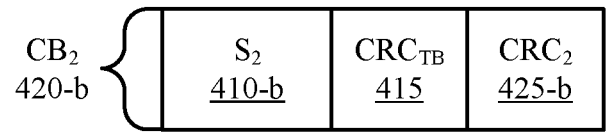
Figure 4:

In some examples, base station 105-a may generate CBs 230 as depicted by the EDC design 400 in FIG. 4. For example, the TB 210 may be segmented into data segment 410-a and data segment 410-b. The EDC generator 225 may generate a CB-level EDC for each of the data segments. The EDC generator 225 may generate CB 420-a by appending data segment 410-a with CRC 425-a, which may be a CB-level EDC. The EDC generator 225 may generate CB 420-b by appending data segment 410-b with CRC 415 and CRC 425-b, which may be respective examples of a TB-level EDC and a CB-level EDC. However, by including both a TB-level EDC and a CB-level EDC in CB 420-b, the EDC design 400 may have significant CRC overhead.

Figure 5:
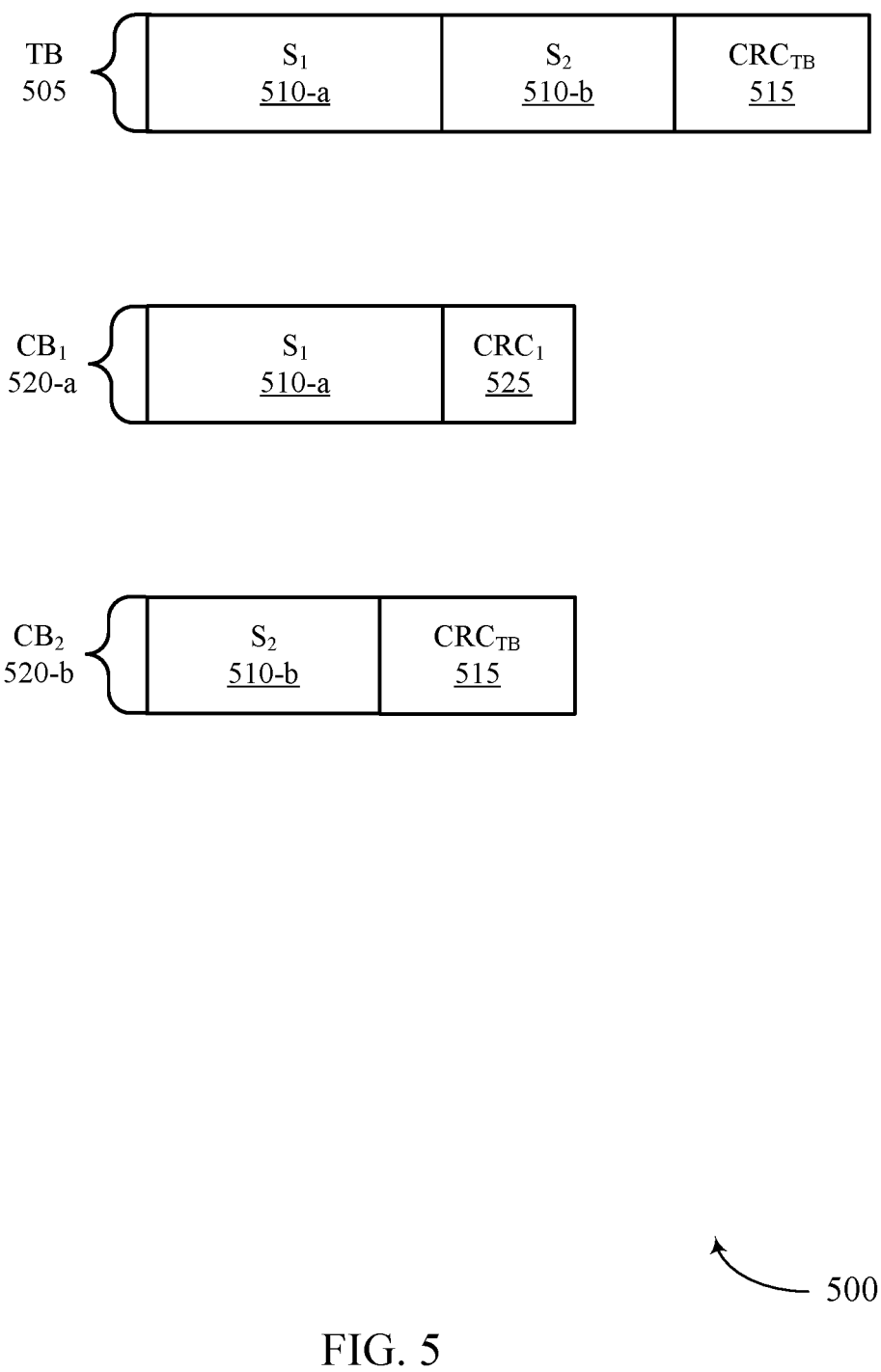
FIG. 5 illustrates an example of an efficient EDC design wireless communications system that supports a reduced overhead EDC design for decoding a codeword in accordance with aspects of the present disclosure.

In another, more efficient example, the EDC generator 225 may generate CBs 230 as depicted by the efficient EDC design 500 in FIG. 5. For example, a TB may be split into two data segments, data segment 510-a and data segment 510-b. The EDC generator may generate a TB-level EDC, CRC 515, and a CB-level EDC, CRC 525. The EDC generator 225 may generate CB 520-a by appending CB-level CRC 525 to data segment 510-a. The EDC generator 225 may generate CB 520-b by appending TB-level CRC 515 to data segment 510-b. In some examples CB 520-a and CB 520-b may be the same length or include the same number of bits. In comparison with CB 420-b of FIG. 4, CB 520-b may not include a CB-level CRC 525, thereby reducing the CRC overhead when transmitting the TB.

Figure 6:
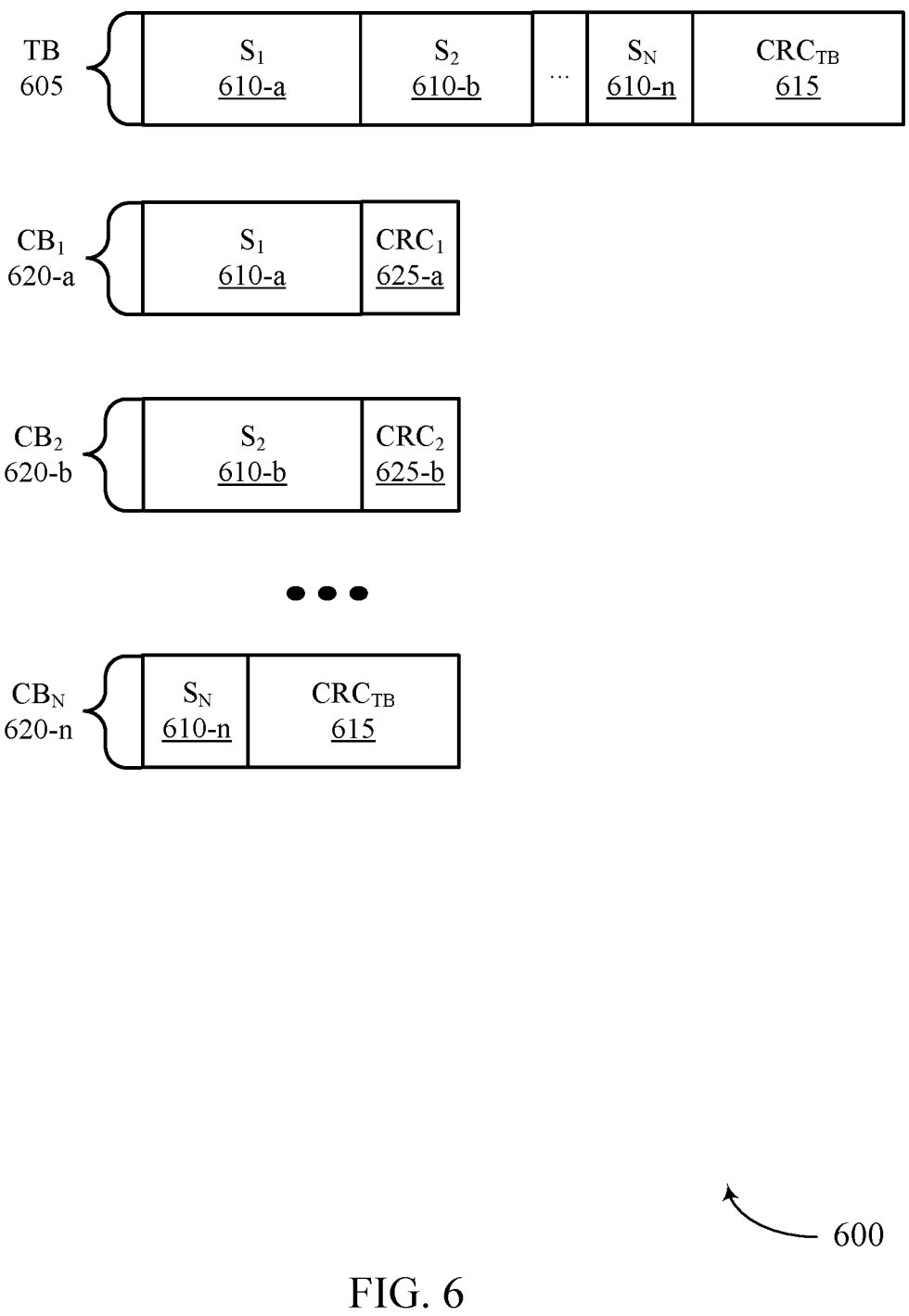
FIG. 6 illustrates an example of an efficient EDC design that supports a reduced overhead EDC design for decoding a codeword in accordance with aspects of the present disclosure.

In another embodiment, the EDC generator 225 may generate CBs 230 as depicted by efficient EDC design 600 in FIG. 6. The efficient EDC design 600 may be similar to the efficient EDC design 500, but the efficient EDC design 600 may be generalized for any number (e.g., N) of CBs 230. For example, the TB 210 may be split into N data segments, including data segment 610-a, data segment 610-b, and other data segments through data segment 610-n. The EDC generator 225 may generate a TB-level EDC, CRC 615, and N−1 CB-level EDCs, CRCs 625. The EDC generator 225 may select a subset of data segments 610 and append a CB-level EDC to each data segment 610 in the subset to generate CB 620-a through CB 620-(n−1). The EDC generator 225 may select at data segment 610 not included in the subset and append CRC 615 (e.g., the TB-level EDC) to generate CB 620-n. CB 620-n may not include a CB-level CRC 625, thereby reducing the CRC overhead when transmitting the TB. In some examples, each CB 620, including CB 620-n, may be the same length, or include the same number of bits.

With reference again to FIG. 2, the EDC generator 225 may output the CBs 230 to the codeword generator 235. The codeword generator 235 may perform an encoding technique on the CBs 230 to generate a codeword 240. In some cases, the codeword 240 may be a polar-encoded codeword. For example, when encoding a TB, the codeword generator 235 may receive as inputs the plurality of CBs that each include one of the data segments. A subset of the CBs may include a CB-level EDC, and a remaining one or more of the CBs may include the TB-level EDC. The codeword generator 235 may encode the plurality of CBs according to a polar code to generate the codeword 240. Other encoding techniques, such as LDPC and Turbo coding may also be used to generate codeword 240. The modulator 245 may modulate the codeword 240 for transmission to a receiver via a wireless communication channel, which may distort the signal 250 carrying the codeword 240 with noise.

Figure 3:
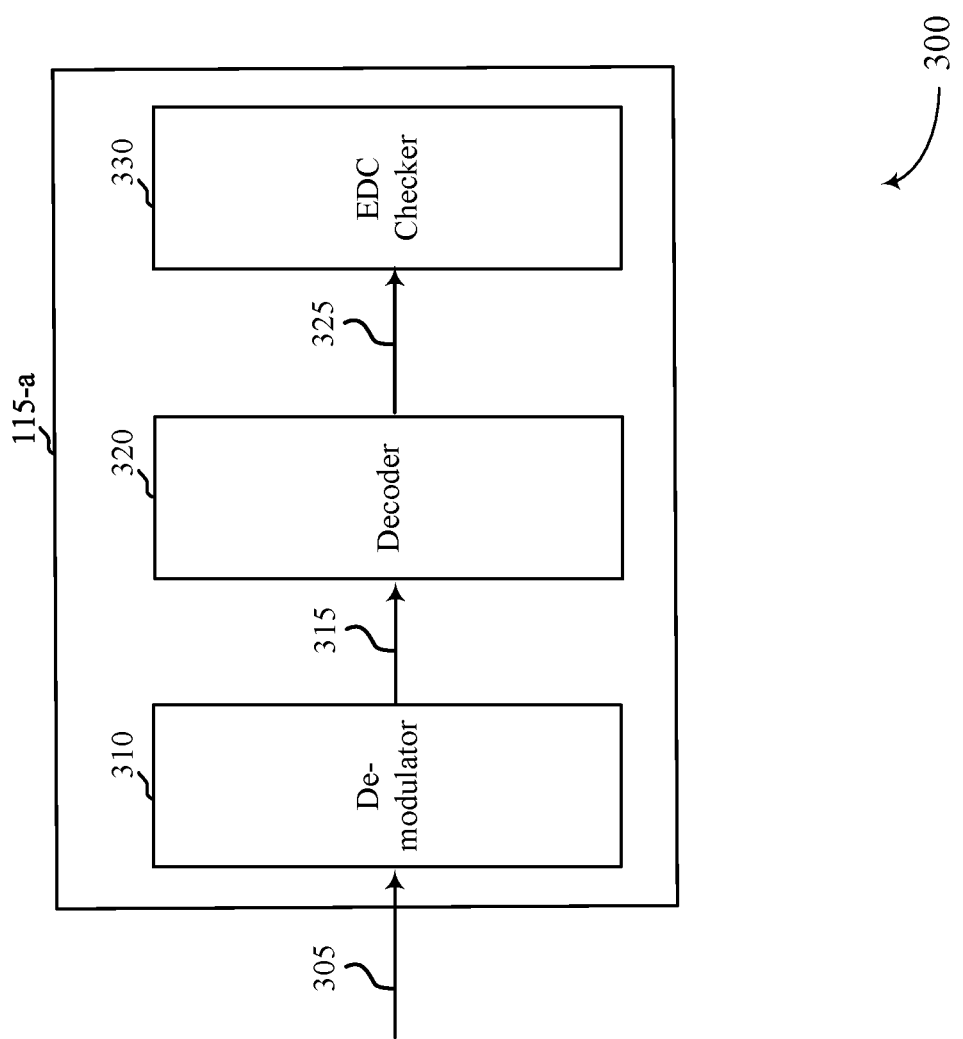
FIG. 3 illustrates an example of a wireless communications system that supports a reduced overhead EDC design for decoding a codeword in accordance with aspects of the present disclosure.

FIG. 3 illustrates an example of a wireless communications system 300 that supports a reduced overhead EDC design for decoding a codeword in accordance with various aspects of the present disclosure. In some examples, wireless communications system 300 may implement aspects of wireless communications system 100. Wireless communications system 300 may include UE 115-a, which may be an example of a UE 115 as described with reference to FIGS. 1-2.

UE 115-a may receive a signal 305 that includes codeword. For example, the codeword may be an example of codeword 240 transmitted by the base station 105-a of FIG. 2. In an example, UE 115-a may include a demodulator 310, a decoder 320, and an EDC checker 330. The demodulator 310 may receive the signal 305 including the codeword and input the demodulated signal 315 into decoder 320 for decoding of the codeword. The demodulated signal may be, for example, a sequence of logarithmic-likelihood ratio (LLR) values representing a probability value of a received bit being a '0' or a '1'. The decoder 320 may perform a list decoding algorithm on the LLR values and output a candidate bit sequence 325. UE 115-a may send the candidate bit sequence 325 to an EDC checker 330. The EDC checker 330 may determine whether the candidate bit sequence 325 passes error detection, or whether to request retransmission of some portions of the candidate bit sequence 325. If the candidate bit sequence 325 passes error detection, the UE 115-a determines that it has properly received the TB sent by the base station 105-a.

The EDC checker 330 may determine whether the candidate bit sequence 325 passed error detection based on the CB-level and TB-level EDCs included in the codeword 240 transmitted by the base station 105-a. Based on prior signaling with the base station 105-a, or based on a pre-configuration, UE 115-a may be aware of the TB size (e.g., number of bits in the TB), a location and order of the CBs of the TB, a CB size (e.g., number of bits in the CB), an EDC size (e.g., number of bits respectively in the CB-level and TB-level EDCs), the location of CB-level EDCs within a CB, the subset of the CBs that include the CB-level EDCs, and which one or more CBs includes the TB-level EDC. Based on the signaling or the pre-configuration, the EDC checker 330 may obtain bit subsequences from the candidate bit sequence 325 corresponding to each CB of the TB. In some cases, the obtained bit subsequences may each include the same number of bits and may be the same size of the CBs.

In some cases, the candidate bit sequence 325 may correspond to an efficient EDC design 500 as illustrated in FIG. 5. For example, the TB may be split into two data segments, data segment 510-a and data segment 510-b. The EDC checker 330 may calculate a CB-level EDC based on the bits in the candidate bit sequence 325 corresponding to the data segment 510-a. If the calculated CB-level EDC matches the CB-level EDC included in bit subsequence obtained from the candidate bit sequence 325, the EDC checker 330 may determine that data segment 510-a passes error detection. In some cases, the EDC checker 330 may identify a first data segment of a first CB of the CBs using a CB-level error detection code of the first CB. The EDC checker 330 may also identify a second data segment of a second CB of the CBs using a CB-level detection code of the second CB. The EDC checker 330 may similarly determine whether the other CBs in the subset pass CB-level error detection.

If all CBs in the subset pass CB-level error detection, the EDC checker 330 may then calculate a TB-level EDC for the TB (e.g., including data segment 510-a and data segment 510-b). The EDC checker 330 may obtain the bit subsequence from the candidate bit sequence 325 for the identified CB 520-b that includes the TB-level CRC. The EDC checker 330 may obtain a data segment 510-b from the identified CB 520-b, and the data segments corresponding to the subset of CBs that passed error detection, and perform the error detection algorithm using all of the data segments to calculate a TB-level EDC. If the calculated TB-level EDC matches the TB-level EDC 515 obtained from the identified CB 520-b included in the candidate bit sequence 325, the EDC checker 330 may determine that data segment 510-b, and TB 505, both pass error detection. In some cases, the EDC checker 330 may determine that the first data segment and the second data segment passed error detection based on determining CB-level error detection determinations associated with the first CB and second CB and the TB-level error detection determination do not indicate an error. In some cases, the EDC checker 330 may set the TB-level error detection determination to indicate that an error was identified based on determining that at least one of CB-level error detection determinations associated with the first CB and the second CB indicates an error. In some cases, the EDC checker 330 may determine that none of CB-level error detection determinations associated with the first CB and the second CB indicate an error, and perform an error detection algorithm on the first data segment and the second data segment to generate the TB-level error detection determination. In some cases, the EDC checker 330 may generate a calculated TB-level error detection code (EDC) based at least in part of the first data segment and the second data segment, obtain a received TB-level EDC from the second CB, and compare the calculated TB-level EDC and the received TB-level EDC, where the TB-level detection determination indicates whether the calculated TB-level EDC matches the received TB-level EDC. In some cases, the EDC checker 330 may have reduced EDC overhead based on CB 520-b not having an appended CB-level CRC 525.

In another example, the candidate bit sequence 325 may correspond to an efficient EDC design 600 as illustrated in FIG. 6. The efficient EDC design 600 may be similar to the efficient EDC design 500, but the efficient EDC design 600 may be generalized for any number (e.g., N) of CBs 230. For example, the TB 210 may be split into N data segments, including data segment 610-a, data segment 610-b, and other data segments 610 through data segment 610-n. The EDC checker 330 may calculate CB-level EDCs for each segment of bits in the candidate bit sequence 325 corresponding to a data segment 610 which was encoded by a CB-level EDC (e.g., each data segment except for data segment 610-n). If the calculated CB-level EDC matches the CB-level EDC in the candidate bit sequence, the corresponding data segment may pass CB-level error detection, and this process may repeat for each of the subset of CBs.

If all CBs in the subset pass CB-level error detection, the EDC checker 330 may then calculate a TB-level EDC for the TB 605. Similar to the description provided above, the EDC checker 330 may calculate a TB-level EDC using the data segments of the TB 605 obtained from the candidate bit sequence 325. The EDC checker 330 may obtain the bit subsequence from the candidate bit sequence 325 for the identified CB 620-n that includes the TB-level CRC 615. The EDC checker 330 may obtain a data segment 610-n from the identified CB 620-n, and the data segments 610-a to 610-(n−1) corresponding to the subset of CBs that passed error detection, and perform the error detection algorithm using all of the data segments to calculate a TB-level EDC. If the calculated TB-level EDC matches the TB-level EDC 615 obtained from the identified CB 620-*n* included in the candidate bit sequence 325, the EDC checker 330 may determine that data segment 610-*n*, and TB 605, both pass error detection. In some cases, the EDC checker 330 may have improved error detection rates based on CB 620-*n* not having an appended CB-level CRC 625, which reduces the CRC overhead for the TB. In some examples, each CB 620, including CB 620-*n*, may be the same length, or include the same number of bits.

For the subset of CBs that include a CB-level EDC, the EDC checker 330 may make a CB-level error detection determination for each CB in the subset of the CBs. For example, EDC checker 330 may determine that a first bit subsequence includes corresponds to bits of a first CB in the subset of CBs that each include a CB-level EDC. Based on the known sizes of the data segment and the CB-level EDC, the EDC checker 330 may obtain from the first bit subsequence the data segment and a received CB-level EDC. The EDC checker 330 may generate a calculated CB-level EDC by applying to the data segment obtained from the bit subsequence the same EDC algorithm that the base station 105-*a* applied to the data segment of the first CB. The EDC checker 330 may compare the received CB-level EDC to the calculated CB-level EDC, and determine that the first CB passed error detection if the received CB-level EDC matches the calculated CB-level EDC.

If the calculated EDC and the received EDC match, EDC checker 330 may determine that the data segment received in the first CB passed error detection, and the EDC checker 330 may output the data segment for further processing by the UE 115-*a*. Otherwise, the EDC checker 330 may determine that the first CB did not pass error detection. The EDC checker 330 may similarly perform error detection on the bit subsequences corresponding to the other CBs in the subset of CBs that each include a CB-level EDC. In some examples, EDC checker 330 may perform error detection on multiple CBs and corresponding CB-level EDCs in parallel, simultaneously, or substantially simultaneously.

Performing error detection at the CB-level EDC may also enable early termination of the decoding process or assist path pruning in an EDC-aided successive cancellation list (e.g., CRC-aided successive cancellation list (CA-SCL)) applied by the decoder 320 when decoding a codeword (e.g., a polar encoded codeword). For example, the EDC checker 330 may obtain one or more bit subsequences of at least one candidate bit sequence 325 from the decoder 320 prior to the decoder 320 generating all bits of the candidate bit sequence 325. In list decoding, the decoder 320 may generate multiple paths through a code tree and may extend each path on a bit by bit basis based on the LLR values. Each path through the code tree may correspond to a different candidate bit sequence 325. The EDC checker 330 may determine that a bit subsequence corresponding to a first CB in a particular candidate bit sequence 325 does not pass error detection, and the decoder 320 optionally may prune a path corresponding to that particular candidate bit sequence 325. If all paths are pruned in such a manner, the decoder 320 may terminate the decoding process early.

If one or more of the CBs in the subset of CBs do not pass CB-level error detection, the EDC checker 330 may, in some examples, skip checking the TB-level EDC, which may improve decoding rates or feedback timing. For example, the EDC checker 330 may set a TB-level error detection determination to indicate that an error was identified based at least in part on determining that at least one of the CB-level error detection determinations indicates an error.

If all of the CBs in the subset of CBs pass CB-level error detection, the EDC checker 330 may make a TB-level error detection determination. In an example, the EDC checker 330 may identify a bit subsequence in the candidate bit sequence 325 that corresponds to bits of an identified CB of the CBs that includes the TB-level EDC and an identified data segment. The EDC checker 330 may form a candidate TB from the data segments that each passed the CB-level EDC check and the identified data segment. Similar to the discussion of the CB-level EDC check, the EDC checker 330 may generate a calculated TB-level EDC by applying to the data segments of the candidate TB the same EDC algorithm that the base station 105-*a* applied to the data segments of the first TB. The EDC checker 330 may compare the received TB-level EDC to the calculated TB-level EDC, and determine that the first TB passed error detection if the received TB-level EDC matches the calculated TB-level EDC. Otherwise, the EDC checker 330 may determine that the candidate TB did not pass error detection.

The EDC checker 330 may generate an error detection determination associated with the plurality of data segments based at least in part on the CB-level error detection determinations and the TB-level error detection determination. If all CBs and TBs passed error detection, the EDC checker 330 may determine that TB, including the plurality of data segments, passed error detection and output the TB for further processing by the UE 115.

If at least one CB does not pass error detection, or the TB-level EDC did not pass error detection, UE 115-*a* may request a retransmission of the corresponding CB(s) or the entire TB. For a TB that includes N CBs, UE 115-*a* may transmit an N-bit sequence to the transmitting device (e.g., base station 105-*a* of FIG. 2) which indicates which zero or more CBs of the TB did not pass error detection, and which zero or more CBs of the TB passed error. For example, a '0' may indicate a CB passed error detection, and a '1' may indicate the CB did not pass error detection. In some examples, base station 105-*a* may receive a sequence of bits, which may indicate a request for a retransmission of one or more data segments. Base station 105-*a* may generate a second codeword as described with reference to FIG. 2 and retransmit the requested data segments in the second codeword. Base station 105-*a* may include new information bits in the second codeword in addition to the retransmitted data segment(s).

While the example of FIG. 2 describes the base station 105-*a* performing the encoding and FIG. 3 describes UE 115-*a* performing the decoding, the roles may be reversed. Moreover, devices other than the base station 105-*a* and the UE 115-*a* may perform the encoding and decoding.

FIG. 4 illustrates an example of an EDC design 400 that supports a reduced overhead EDC design for decoding a codeword in accordance with various aspects of the present disclosure. In some examples, EDC design 400 may implement aspects of wireless communications system 100.

A transmitting device may segment a TB 405 into data segment 410-*a* (e.g., $S_1$) and data segment 410-*b* (e.g., $S_2$). In some cases, CRC may be attached to each data segment 410 to improve decoding performance. Separate CRC bits may be applied for the TB 405 and the CBs 420. For example, TB-level CRC 415 may encode data segment 410-*a* and data segment 410-*b* at the TB level. CRC 425-*a* may encode data segment 410-*a* at a CB level, and CRC 425-*b* may encode data segment 410-*b* and TB-level $CRC_{TB}$ 415 at a CB level. In some examples, a CRC (e.g., TB-level CRC 415 or a CRC 425) may be 24 bits long. In some examples, CRC 415 may check TB 405 (e.g., data segment 410-*a*+data segment 410-*b*) after data segment 410-*a* and data segment 410-*b* are checked by CRC 425-*a* and CRC 425-*b* respectively.

In some cases, the overall CRC overhead in FIG. 4 may become large when the data segments 410 are not large. For example, the CRC overhead as illustrated may be large when there are two CBs 420 and three CRCs (e.g., CRCs 425-*a* and 425-*b* and TB-level CRC 415) applied for the two CBs 420. In some instances, EDC design 400 may not be efficient for URLLC with medium-sized or small TBs.

By instead implementing an EDC design as described with reference to FIG. 5 or 6, CRC overhead may be significantly reduced (e.g., for Polar codes with middle-sized CBs). For example, if TB 405 may include 400 bits, and the transmitting device may use a 24-bit design for CRCs 425 and CRC 415. Therefore, EDC design 400 may have a CRC overhead of 18% (24 bits per CRC*3 CRCs/400 bits per TB). However, a base station 105-*a* implementing the techniques illustrated in FIG. 5 for the same TB may have a CRC overhead of 12% (24 bits per CRC*2 CRCs/400 bits per TB). Therefore, EDC design 400 may be inefficient compared to the efficient EDC design 500 or 600, resulting in less throughput, longer encoding/decoding times, or significantly larger EDC overhead. In an example, a 400-bits TB, that is segmented into two CBs, may have a coded block size of 512 bits. In some examples, the EDC designs 500 and 600 may reduce decoding complex since the CRC check at CB level is omitted for the last CB 520-*b* and CBN 620-*n*. In some examples, the algorithm described herein, for a list size of 8 in a CA-SCL decoder, may achieve a coding gain relative to conventional solutions regardless of the number of information bits included in the TB.

FIG. 5 illustrates an example of an efficient EDC design 500 that supports a reduced overhead EDC design for decoding a codeword in accordance with various aspects of the present disclosure. In some examples, efficient EDC design 500 may implement aspects of wireless communications system 100. The efficient EDC design 500 may be implemented by a UE 115 or a base station 105 as described herein with reference to FIGS. 1 through 3.

TB 505 may similarly include two data segments 510, data segment 510-*a* and data segment 510-*b*. TB-level CRC 515 may encode the data segments 510 at a TB level. CRC 525 may be used to encode data segment 510-*a* at a CB level, generating CB 520. Instead of generating a CRC 525 for each CB 520, the TB-level CRC 515 may be used as a CB-level CRC, and TB-level CRC 515 may be appended to data segment 510-*b* to generate CB 520-*b*. TB-level CRC may be generated based on both data segments 510. In some examples, the length of CB 520-*a* may be equal to the length of CB 520-*b*. That is, the length of data segment 510-*a* and CRC 525 may be equal to the length of data segment 510-*b* and TB-level CRC 515. By having CBs 520 of similar length, the same codes may be applied to CB 520-*a* and CB 520-*b*, and the same decoder may be used for CB 520-*a* and 520-*b*. In some examples, TB-level CRC 515 may be longer than CRC 525. In some cases, the extra length of TB-level CRC 515 may provide lower undetectable error probability.

For a receiving device, TB-level CRC 515 may be used to check TB 505 after data segment 510-*a* is checked by CRC 515. In some examples, checking data segment 510-*a* first may be used for path pruning in CA-SCL decoding for Polar codes. Thus, by checking data segment 510-*a* first, the receiving device may perform early termination of the TB 505, as the receiving device may not check data segment 510-*b* if data segment 510-*a* fails. In some cases, the receiving device may identify data segment 510-*a* of CB 520-*a* using a CB-level error detection code of the first CB. The receiving device may also identify data segment 510-*b* of CB 520-*b* using a CB-level detection code of the second CB. In some cases, the receiving device may generate TB 505 by combining the decoded data segment 510-*a* and the decoded data segment 510-*b*, and perform a TB-level error detection determination of the decoded data segment 510-*a* and the decoded data segment 510-*b* of TB 505 using a TB-level error detection code.

In some cases, the receiving device may determine that data segment 510-*a* and data segment 510-*b* passed error detection based at least in part on determining CB-level error detection determinations associated with CB 520-*a* and CB 520-*b* and the TB-level error detection determination do not indicate an error. In some cases, the receiving device may set the TB-level error detection determination to indicate that an error was identified based on determining that at least one of CB-level error detection determinations associated with CB 520-*a* and CB 520-*b* indicates an error. In some cases, the receiving device may determine that none of CB-level error detection determinations associated with CB 520-*a* and CB 520-*b* indicate an error, and perform an error detection algorithm on data segment 510-*a* and data segment 510-*b* to generate the TB-level error detection determination. In some cases, the receiving device may generate a calculated TB-level EDC based at least in part of the decoded data segment 510-*a* and the decoded data segment 510-*b*, obtain a received TB-level EDC from CB 520-*b*, and compare the calculated TB-level EDC and the received TB-level EDC, where the TB-level detection determination indicates whether the calculated TB-level EDC matches the received TB-level EDC.

The receiving device may request retransmission of one or more data segments 510 based on whether the data segments 510 were successfully or unsuccessfully received. For example, if CRC 525 passes error detection but CRC 515 fails, the receiving device may determine that data segment 510-*a* was received successfully, and data segment 510-*b* was not. Therefore, the receiving device may request a retransmission of data segment 510-*b*. In another example, CRC 525 may fail, and the receiving device may early terminate the decoding procedure and request a retransmission of both data segments 525.

FIG. 6 illustrates an example of an efficient EDC design 600 that supports a reduced overhead EDC design for decoding a codeword in accordance with various aspects of the present disclosure. In some examples, efficient EDC design 600 may implement aspects of wireless communications system 100. The efficient EDC design 600 may be implemented by a UE 115 or a base station 105 as described herein with reference to FIGS. 1 through 3.

Efficient EDC design 600 may be similar to the efficient EDC design 500, but the efficient EDC design 600 may be generalized to N CBs 620. That is, the TB 605 may be segmented into N data segments 610. TB-level CRC 615 may be generated based on each data segment 610, or all information bits, in the TB 605. As described above, CRC 625-*a* may encode data segment 610-*a*, CRC 625-*b* may encode data segment 610-*b*, etc. In some examples, the length of each CB may be the same to ensure that the same codes are applied for each CB and the same decoder may be used for each CB. For example, the length of data segment $S_i+CRC_i$, where i=1, 2 ..., n, may be equal to the length of $S_N+CRC_{TB}$. In some examples, the length of TB-level CRC 615 may be larger than that of a CRC 625 to provide lower undetectable error probability. In some examples, the number of bits in data segment 610-a may be fewer than the other data segments 610-a to 610-(n–1) to account for TB-level CRC 615 having more bits than the CB-level CRC 625.

As described herein, a receiving device may use TB-level CRC 615 to check TB 605 after each data segment 610, except for data segment 610-n, is checked by the corresponding CRC 625. In some examples, checking the data segment 610 encoded by a CB-level CRC 625 first may be used for path pruning in CRC-aided successive cancellation list (CA-SCL) decoding for polar codes. Thus, by checking the data segments 610 encoded by a CRC 625 first, the receiving device may perform early termination of the TB 605, as the receiving device may skip checking a TB-level CRC if a previous data segment 610 fails.

The receiving device may request retransmission of data segments 610 based on whether the data segments 610 were successfully received. For example, if each CRC 625 passes, but TB-level CRC 615 fails, the receiving device may determine that data segment 610-n was not successfully received, while each other data segment 610 was successfully received. Therefore, the receiving device may request a retransmission of data segment 510-b. In another example, CRC 625-b may fail, but each other CRC 625 may pass. The receiving device may early terminate the decoding procedure of data segment 610-n and request a retransmission of data segment 610-b and data segment 610-n. In general, the receiving device may request retransmission of any data segment 610 which has a failed CB-level error detection. If any of the CRCs 625 fail, the receiving device may early terminate a decoding procedure of the TB-level CRC 615 and request a retransmission of data segment 610-n.

For example, the receiving device may transmit an n-bit HARQ sequence to the transmitting device, where each bit corresponds to a data segment 610. If a bit in the HARQ sequence is a '1', this may indicate a request for a retransmission of the corresponding data segment 610. If a bit in the HARQ sequence is a '0', this may indicate that the corresponding data segment 610 was successfully received.

Figure 7:
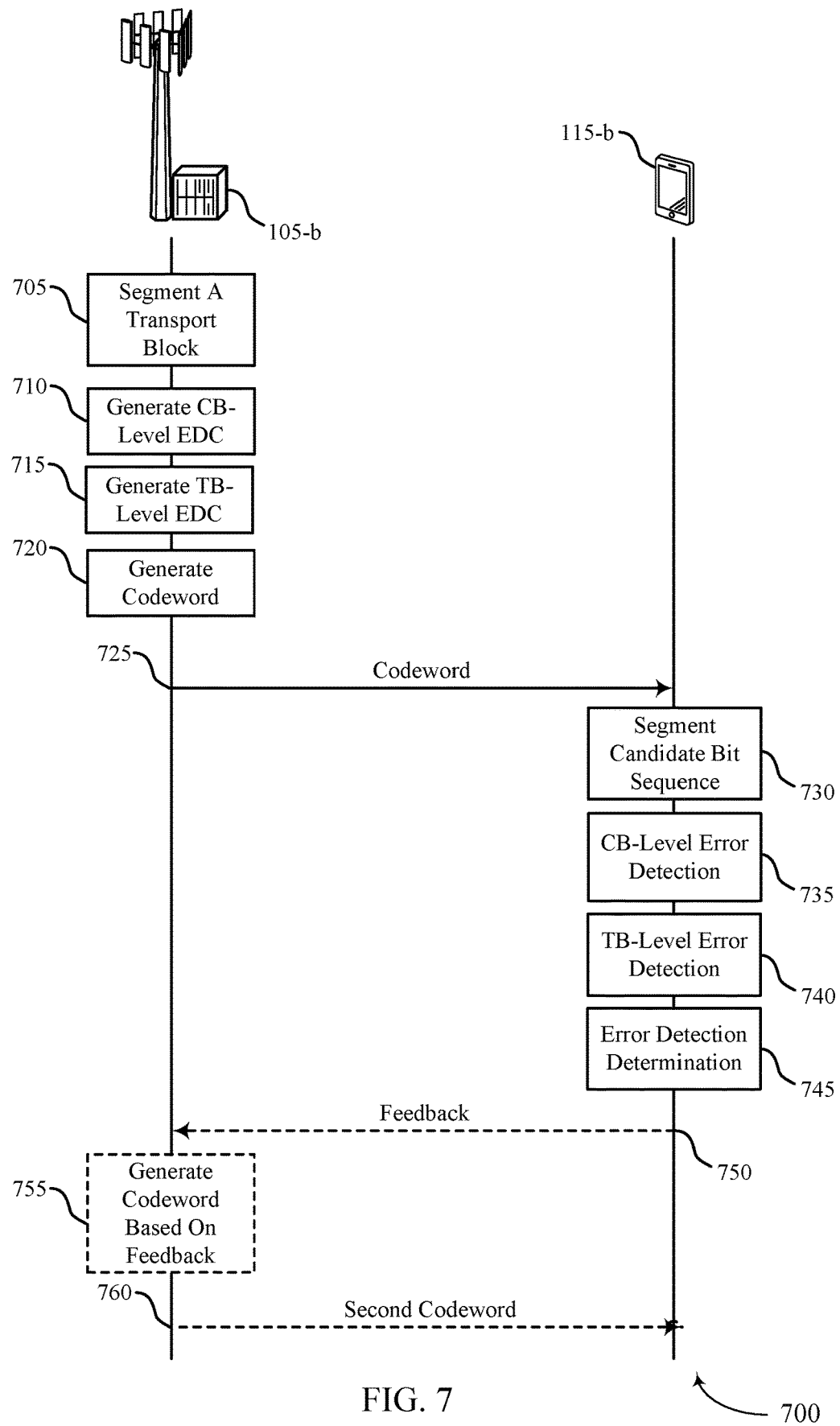
FIG. 7 illustrates an example of a process flow that supports a reduced overhead EDC design for decoding a codeword in accordance with aspects of the present disclosure.

FIG. 7 illustrates an example of a process flow 700 that supports a reduced overhead EDC design for decoding a codeword in accordance with various aspects of the present disclosure. In some examples, process flow 700 may implement aspects of wireless communications system 100. Process flow 700 may illustrate UE 115-b and base station 105-b, which may be respective examples of a UE 115 and base station 105 as described herein. While process flow 700 illustrates base station 105-b generating a codeword according to an efficient EDC design and UE 115-b decoding the codeword according to the efficient EDC design, in some examples UE 115-b may generate the codeword and base station 105-b may decode the codeword, among other various configurations.

At 705, base station 105-b may segment a TB into a plurality of data segments. At 710, base station 105-b may generate a CB-level EDC for each data segment of a subset of the plurality of data segments. In some examples, base station 105-b may generate the CB-level EDC for each of the data segments in the set other than an identified data segment of the plurality of data segments.

At 715, base station 105-b may generate a TB-level EDC based on the plurality of data segments. In some cases, base station 105-b may associate each data segment of the plurality of data segments with a respective CB of a plurality of CBs, where an identified CB of the plurality of CBs includes the identified data segment and the TB-level EDC. In some cases, each of the plurality of CBs other than the identified CB may include a respective data segment of the plurality of data segments other than the identified data segment and a respective CB-level EDC of the CB-level EDCs. In some cases, the CB-level EDCs may include a first number of bits, and the TB-level EDCs may include a second number of bits which is different from the first number of bits. In some examples, each of the CBs may be of the same size (e.g., include the same number of bits).

At 720, base station 105-b may generate a codeword. The codeword may be generated based on the plurality of data segments, the CB-level EDCs for the subset of the plurality of data segments, and the TB-level EDC. The base station 105-b may encode the plurality of data segments, the CB-level EDCs for the subset of the plurality of data segments, and the TB-level EDC according to a polar code to generate a polar-encoded codeword. Then, at 725, base station 105-b may transmit the codeword to UE 115-b. In some examples, base station 105-b may indicate to the UE 115-b a coding scheme being used to generate the codeword, which subset of the CBs in the TB include the CB-level EDC, and which one or more CBs in the TB include the TB-level EDC.

UE 115-b may receive a signal including the codeword and process the signal to obtain a candidate bit sequence. In some cases, UE 115-b may perform a list decoding algorithm to decode the codeword according to a polar code to generate the candidate bit sequence. At 730, UE 115-b may segment the candidate bit sequence into a plurality of CBs that each include a respective data segment of a plurality of data segments.

At 735, UE 115-b may generate a CB-level error detection determination for each CB of a subset of the plurality of CBs. In some cases, the CB-level error detection determination includes generating a calculated CB-level EDC for the first data segment, obtaining a received CB-level EDC from the first CB, and comparing the calculated CB-level EDC and the received CB-level and determining whether the calculated CB-level EDC matches the received CB-level EDC.

At 740, UE 115-b may generate a TB-level error detection determination associated with the plurality of data segments. In some cases, UE 115-b may determine that none of the CB-level error detection determinations indicate an error and perform an error detection algorithm on the plurality of data segments to generate the TB-level error detection determination.

UE 115-b may then generate an error detection determination at 745. The error detection determination may be associated with the plurality of data segments based on the CB-level error detection determinations and the TB-level error detection determinations. For example, the UE 115-b may determine that the plurality of data segments passed error detection based on determining that each CB-level error detection determination and the TB-level error detection determination do not indicate an error.

In some cases, UE 115-b may transmit feedback for the data segments at 750. For example, UE 115-b may indicate to base station 105-b that the data segments passed error detection. In another example, UE 115-b may transmit feedback indicating that one or more of the plurality of data segments did not pass error detection based on the CB-level error detection determinations. In some cases, UE 115-b may transmit feedback indicating that the error detection algorithm detected a TB-level error.

At 755, base station 105-b, in some cases, may generate a second codeword based on the feedback and one or more indicated data segments which did not pass error detection.

In some examples, the second codeword may be generated as described herein, and base station 105-*b* may transmit new information with the retransmitted data segments. The base station 105-*b* may transmit the second codeword to UE 115-*b* at 760.

Figure 8:
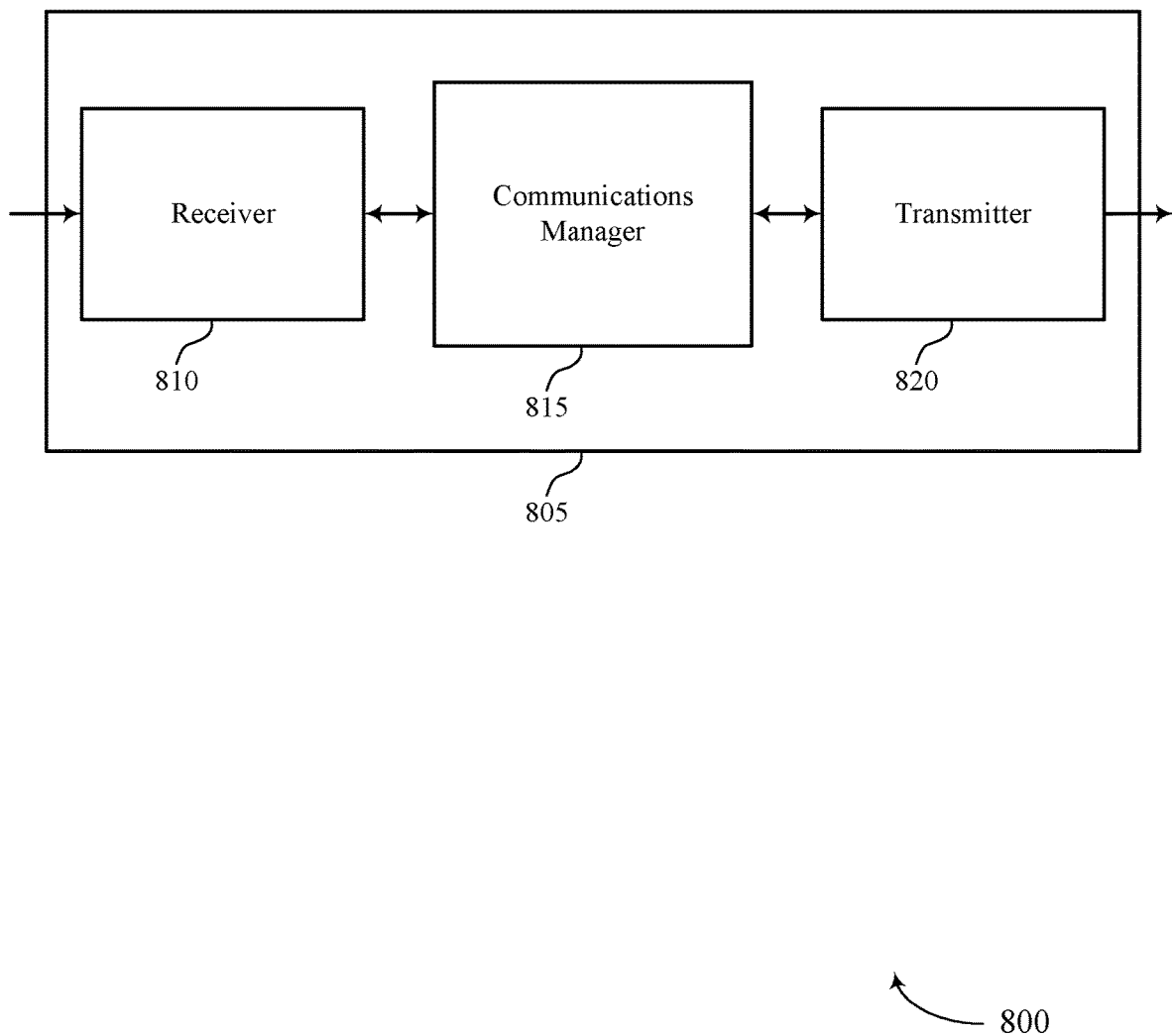
FIGS. 8 through 10 show block diagrams of a device that supports a reduced overhead EDC design for decoding a codeword in accordance with aspects of the present disclosure.

FIG. 8 shows a block diagram 800 of a wireless device 805 that supports a reduced overhead EDC design for decoding a codeword in accordance with aspects of the present disclosure. Wireless device 805 may be an example of aspects of a user equipment (UE) 115 or base station 105 as described herein. Wireless device 805 may include receiver 810, communications manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to reduced overhead EDC design for decoding a codeword, etc.). Information may be passed on to other components of the wireless device 805. The receiver 810 may be an example of aspects of the transceiver 1135 described with reference to FIG. 11. The receiver 810 may utilize a single antenna or a set of antennas.

Communications manager 815 may be an example of aspects of the communications manager 1115 described with reference to FIG. 11. Communications manager 815 and/or at least some of its various sub-components may be implemented in hardware, software executed by a processor, firmware, or any combination thereof. If implemented in software executed by a processor, the functions of the communications manager 815 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure. The communications manager 815 and/or at least some of its various sub-components may be physically located at various positions, including being distributed such that portions of functions are implemented at different physical locations by one or more physical devices. In some examples, communications manager 815 and/or at least some of its various sub-components may be a separate and distinct component in accordance with various aspects of the present disclosure. In other examples, communications manager 815 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Communications manager 815 may segment a TB into a plurality of data segments, generate a CB-level EDC for each data segment of a subset of the plurality of data segments, generate a TB-level EDC based on the plurality of data segments, generate a codeword based on the plurality of data segments, the CB-level EDCs for the subset of the plurality of data segments, and the TB-level EDC, and transmit the codeword via a wireless channel. The communications manager 815 may also process a signal including a codeword to obtain a candidate bit sequence, segment the candidate bit sequence into a plurality of CBs that each include a respective data segment of a plurality of data segments, generate a CB-level error detection determination for each CB of a subset of the plurality of CBs, generate a TB-level error detection determination associated with the plurality of data segments, and generate an error detection determination associated with the plurality of data segments based on the CB-level error detection determinations and the TB-level error detection determination. In some cases, communications manager 815 may process signal comprising a codeword to obtain a candidate bit sequence, segment the candidate bit sequence into a plurality of CBs that each comprises a respective data segment of a plurality of data segments, identify a first data segment of a first CB of the plurality of CBs using a CB-level EDC of the first CB, identify a second data segment of a second CB of the plurality of CBs using a CB-level detection code of the second CB, generate a TB by combining the first data segment and the second data segment, and perform a TB-level error detection determination of the first data segment and the second data segment of the TB using a TB-level error detection code.

Transmitter 820 may transmit signals generated by other components of the wireless device 805. In some examples, the transmitter 820 may be collocated with a receiver 810 in a transceiver module. For example, the transmitter 820 may be an example of aspects of the transceiver 1135 described with reference to FIG. 11. The transmitter 820 may utilize a single antenna or a set of antennas.

Figure 9:
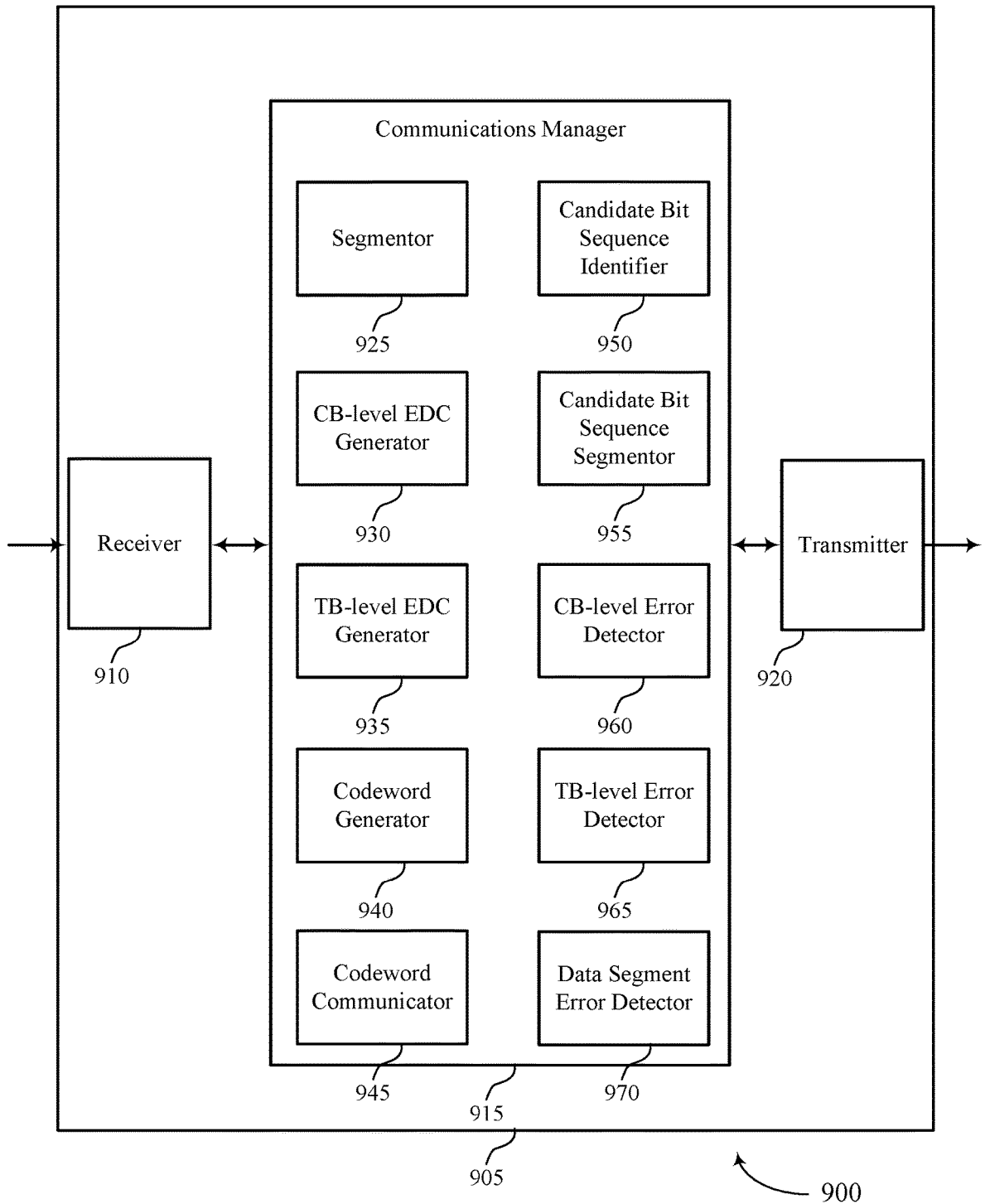

FIG. 9 shows a block diagram 900 of a wireless device 905 that supports a reduced overhead error detection code design for decoding a codeword in accordance with aspects of the present disclosure. Wireless device 905 may be an example of aspects of a wireless device 805 or a UE 115 or base station 105 as described with reference to FIG. 8. Wireless device 905 may include receiver 910, communications manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to reduced overhead error detection code design for decoding a codeword, etc.). Information may be passed on to other components of the wireless device 905. The receiver 910 may be an example of aspects of the transceiver 1135 described with reference to FIG. 11. The receiver 910 may utilize a single antenna or a set of antennas.

Communications manager 915 may be an example of aspects of the communications manager 1115 described with reference to FIG. 11. Communications manager 915 may also include segmentor 925, CB-level EDC generator 930, TB-level EDC generator 935, codeword generator 940, codeword communicator 945, candidate bit sequence identifier 950, candidate bit sequence segmentor 955, CB-level error detector 960, TB-level error detector 965, and data segment error detector 970. Segmentor 925 may segment a TB into a plurality of data segments.

CB-level EDC generator 930 may generate a CB level CB-level EDC for each data segment of a subset of the plurality of data segments. In some cases, generating the CB-level EDC for each data segment of the subset of the plurality of data segments includes: generating the CB-level EDC for each of the plurality of data segments other than an identified data segment of the plurality of data segments.

TB-level EDC generator 935 may generate a TB-level EDC based on the plurality of data segments. In some cases, each of the CB-level EDCs includes a first number of bits and the TB-level EDC includes a second number of bits that differs from the first number of bits. In some cases, at least one CB of a plurality of CBs includes the TB-level EDC and a data segment of the plurality of data segments that has fewer bits than at least one other data segment of the plurality of data segments. In some cases, each of the CB-level EDCs is a CB-level CRC and the TB-level EDC is a TB-level CRC.

Codeword generator 940 may generate a codeword based on the plurality of data segments, the CB-level EDCs for the subset of the plurality of data segments, and the TB-level EDC. In some cases, generating the codeword includes: encoding the plurality of data segments, the CB-level EDCs, and the TB-level EDC using a polar code to obtain the codeword. Codeword communicator 945 may transmit the codeword via a wireless channel.

Candidate bit sequence identifier 950 may process a signal including a codeword to obtain a candidate bit sequence. In some cases, processing the signal including the codeword to obtain the candidate bit sequence includes: performing a list decoding algorithm to decode the codeword according to a polar code to generate the candidate bit sequence.

Candidate bit sequence segmentor 955 may segment the candidate bit sequence into a plurality of CBs that each include a respective data segment of a plurality of data segments.

CB-level error detector 960 may generate a CB-level error detection determination for each CB of a subset of the plurality of CBs, generate a calculated CB-level EDC for the first data segment, obtain a received CB-level EDC from the first CB, and compare the calculated CB-level EDC and the received CB-level EDC, where the CB-level error detection determination for the first CB indicates whether the calculated CB-level EDC matches the received CB-level EDC. In some cases, generating the CB-level error detection determination for each CB of the subset of the plurality of CBs includes: obtaining a first data segment of the plurality of data segments from a first CB of the plurality of CBs. In some cases, CB-level error detector 1055 may identify a first data segment of a first CB of the plurality of CBs using a CB-level error detection code of the first CB. In some cases, CB-level error detector 1055 may also identify a second data segment of a second CB of the plurality of CBs using a CB-level error detection code of the second CB.

TB-level error detector 965 may generate a TB-level error detection determination associated with the plurality of data segments, perform an error detection algorithm on the plurality of data segments to generate the TB-level error detection determination, transmit feedback indicating that the plurality of data segments passed error detection, obtain a received TB-level EDC from an identified CB of the plurality of CBs, and compare the calculated TB-level EDC and the received TB-level EDC, where the TB-level error detection determination indicates whether the calculated TB-level EDC matches the received TB-level EDC. In some cases, generating the TB-level error detection determination includes: setting the TB-level error detection determination to indicate that an error was identified based on determining that at least one of the CB-level error detection determinations indicate an error. In some cases, generating the TB-level error detection determination includes: determining that none of the CB-level error detection determinations indicate an error. In some cases, performing the error detection algorithm includes: transmitting feedback indicating that the error detection algorithm detected a TB-level error. In some cases, performing the error detection algorithm includes: determining that the error detection algorithm did not detect a TB-level error. In some cases, generating the TB-level error detection determination includes: generating a calculated TB-level EDC based on the plurality of data segments.

In some cases, TB-level error detector 965 may perform a TB-level error detection determination of a first data segment and a second data segment of a TB using a TB-level error detection code. In some cases, TB-level error detector 965 may determine that the first data segment and the second data segment passed error detection based at least in part on determining CB-level error detection determinations associated with the first CB and second CB and the TB-level error detection determination do not indicate an error. In some cases, TB-level error detector 965 may set the TB-level error detection determination to indicate that an error was identified based at least in part on determining that at least one of CB-level error detection determinations associated with the first CB and the second CB indicates an error. In some cases, TB-level error detector 965 may determine that none of CB-level error detection determinations associated with the first CB and the second CB indicate an error, and perform an error detection algorithm on the first data segment and the second data segment to generate the TB-level error detection determination. In some cases, TB-level error detector 965 may generate a calculated TB-level error detection code (EDC) based at least in part of the first data segment and the second data segment, obtain a received TB-level EDC from the second CB, and compare the calculated TB-level EDC and the received TB-level EDC, where the TB-level detection determination indicates whether the calculated TB-level EDC matches the received TB-level EDC.

Data segment error detector 970 may generate an error detection determination associated with the plurality of data segments based on the CB-level error detection determinations and the TB-level error detection determination. In some cases, generating the error detection determination associated with the plurality of data segments includes: determining that the plurality of data segments passed error detection based on determining that each of the CB-level error detection determinations and the TB-level error detection determination do not indicate an error.

Transmitter 920 may transmit signals generated by other components of the wireless device 905. In some examples, the transmitter 920 may be collocated with a receiver 910 in a transceiver module. For example, the transmitter 920 may be an example of aspects of the transceiver 1135 described with reference to FIG. 11. The transmitter 920 may utilize a single antenna or a set of antennas.

Figure 10:
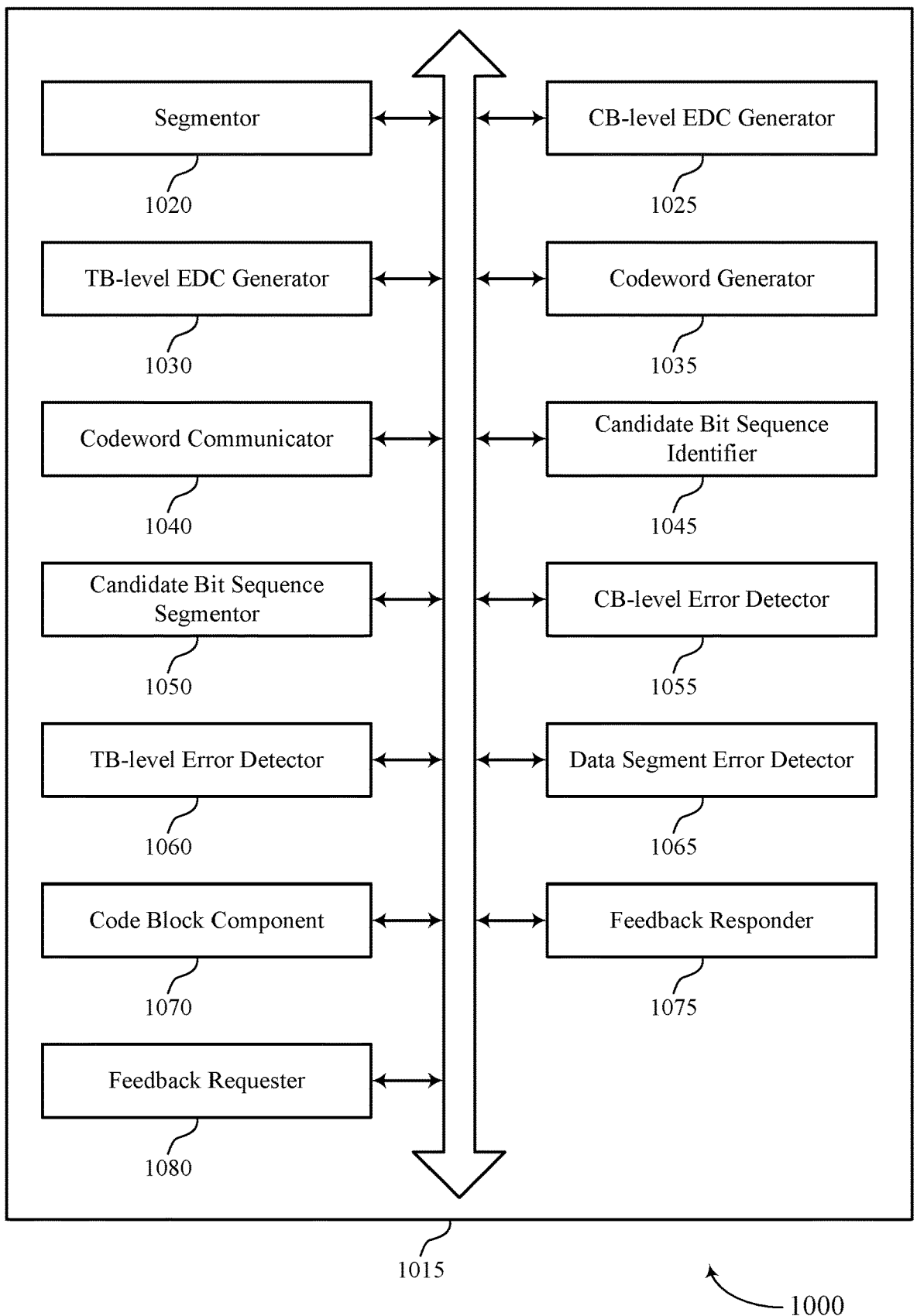

FIG. 10 shows a block diagram 1000 of a communications manager 1015 that supports a reduced overhead EDC design for decoding a codeword in accordance with aspects of the present disclosure. The communications manager 1015 may be an example of aspects of a communications manager 815, a communications manager 915, or a communications manager 1115 described with reference to FIGS. 8, 9, and 11. The communications manager 1015 may include segmentor 1020, CB-level EDC generator 1025, TB-level EDC generator 1030, codeword generator 1035, codeword communicator 1040, candidate bit sequence identifier 1045, candidate bit sequence segmentor 1050, CB-level error detector 1055, TB-level error detector 1060, data segment error detector 1065, CB component 1070, feedback responder 1075, and feedback requester 1080. Each of these modules may communicate, directly or indirectly, with one another (e.g., via one or more buses).

Segmentor 1020 may segment a TB into a plurality of data segments. CB-level EDC generator 1025 may generate a CB-level EDC for each data segment of a subset of the plurality of data segments. In some cases, generating the CB-level EDC for each data segment of the subset of the plurality of data segments includes: generating the CB-level EDC for each of the plurality of data segments other than an identified data segment of the plurality of data segments.

TB-level EDC generator 1030 may generate a TB-level EDC based on the plurality of data segments. In some cases, each of the CB-level EDCs includes a first number of bits and the TB-level EDC includes a second number of bits that differs from the first number of bits. In some cases, at least one CB of a plurality of CBs includes the TB-level EDC and a data segment of the plurality of data segments that has fewer bits than at least one other data segment of the plurality of data segments. In some cases, each of the CB-level EDCs is a CB-level CRC and the TB-level EDC is a TB-level CRC.

Codeword generator 1035 may generate a codeword based on the plurality of data segments, the CB-level EDCs for the subset of the plurality of data segments, and the TB-level EDC. In some cases, generating the codeword includes: encoding the plurality of data segments, the CB-level EDCs, and the TB-level EDC using a polar code to obtain the codeword. Codeword communicator 1040 may transmit the codeword via a wireless channel.

Candidate bit sequence identifier 1045 may process a signal including a codeword to obtain a candidate bit sequence. In some cases, processing the signal including the codeword to obtain the candidate bit sequence includes: performing a list decoding algorithm to decode the codeword according to a polar code to generate the candidate bit sequence.

Candidate bit sequence segmentor 1050 may segment the candidate bit sequence into a plurality of CBs that each include a respective data segment of a plurality of data segments.

CB-level error detector 1055 may generate a CB-level error detection determination for each CB of a subset of the plurality of CBs, generate a calculated CB-level EDC for the first data segment, obtain a received CB-level EDC from the first CB, and compare the calculated CB-level EDC and the received CB-level EDC, where the CB-level error detection determination for the first CB indicates whether the calculated CB-level EDC matches the received CB-level EDC. In some cases, generating the CB-level error detection determination for each CB of the subset of the plurality of CBs includes: obtaining a first data segment of the plurality of data segments from a first CB of the plurality of CBs. In some cases, CB-level error detector 1055 may identify a first data segment of a first CB of the plurality of CBs using a CB-level error detection code of the first CB. In some cases, CB-level error detector 1055 may also identify a second data segment of a second CB of the plurality of CBs using a CB-level error detection code of the second CB.

TB-level error detector 1060 may generate a TB-level error detection determination associated with the plurality of data segments, perform an error detection algorithm on the plurality of data segments to generate the TB-level error detection determination, transmit feedback indicating that the plurality of data segments passed error detection, obtain a received TB-level EDC from an identified CB of the plurality of CBs, and compare the calculated TB-level EDC and the received TB-level EDC, where the TB-level error detection determination indicates whether the calculated TB-level EDC matches the received TB-level EDC. In some cases, generating the TB-level error detection determination includes: setting the TB-level error detection determination to indicate that an error was identified based on determining that at least one of the CB-level error detection determinations indicate an error. In some cases, generating the TB-level error detection determination includes: determining that none of the CB-level error detection determinations indicate an error. In some cases, performing the error detection algorithm includes: transmitting feedback indicating that the error detection algorithm detected a TB-level error. In some cases, performing the error detection algorithm includes: determining that the error detection algorithm did not detect a TB-level error. In some cases, generating the TB-level error detection determination includes: generating a calculated TB-level EDC based on the plurality of data segments.

In some cases, TB-level error detector 1060 may perform a TB-level error detection determination of a first data segment and a second data segment of a TB using a TB-level error detection code. In some cases, TB-level error detector 1060 may determine that the first data segment and the second data segment passed error detection based at least in part on determining CB-level error detection determinations associated with the first CB and second CB and the TB-level error detection determination do not indicate an error. In some cases, TB-level error detector 1060 may set the TB-level error detection determination to indicate that an error was identified based at least in part on determining that at least one of CB-level error detection determinations associated with the first CB and the second CB indicates an error. In some cases, TB-level error detector 1060 may determine that none of CB-level error detection determinations associated with the first CB and the second CB indicate an error, and perform an error detection algorithm on the first data segment and the second data segment to generate the TB-level error detection determination. In some cases, TB-level error detector 1060 may generate a calculated TB-level error detection code (EDC) based at least in part of the first data segment and the second data segment, obtain a received TB-level EDC from the second CB, and compare the calculated TB-level EDC and the received TB-level EDC, where the TB-level detection determination indicates whether the calculated TB-level EDC matches the received TB-level EDC.

Data segment error detector 1065 may generate an error detection determination associated with the plurality of data segments based on the CB-level error detection determinations and the TB-level error detection determination. In some cases, generating the error detection determination associated with the plurality of data segments includes: determining that the plurality of data segments passed error detection based on determining that each of the CB-level error detection determinations and the TB-level error detection determination do not indicate an error.

CB component 1070 may associate each data segment of the plurality of data segments with a respective CB of a plurality of CBs, where an identified CB of the plurality of CBs includes the identified data segment and the TB-level EDC. In some cases, each of the plurality of CBs other than the identified CB includes a respective data segment of the plurality of data segments other than the identified data segment and a respective CB-level EDC of the CB-level EDCs.

Feedback responder 1075 may receive feedback indicating that at least one data segment of the plurality of data segments did not pass error detection, generate a second codeword based on the at least one data segment, transmit the second codeword via the wireless channel, and process a sequence of bits included in the feedback to determine which one or more of the plurality of data segments passed error detection and which one or more of the plurality of data segments did not pass error detection.

Feedback requester 1080 may transmit feedback indicating that one or more of the plurality of data segments did not pass error detection based on the CB-level error detection determinations. In some cases, feedback requester 1080 may transmit feedback indicating that an error detection algorithm detected a TB-level error. In cases where the error detection algorithm did not detect a TB-level error, feedback requester 1080 may transmit feedback indicating that a first data segment and a second data segment of the plurality of the data segments passed error detection.

Figure 11:
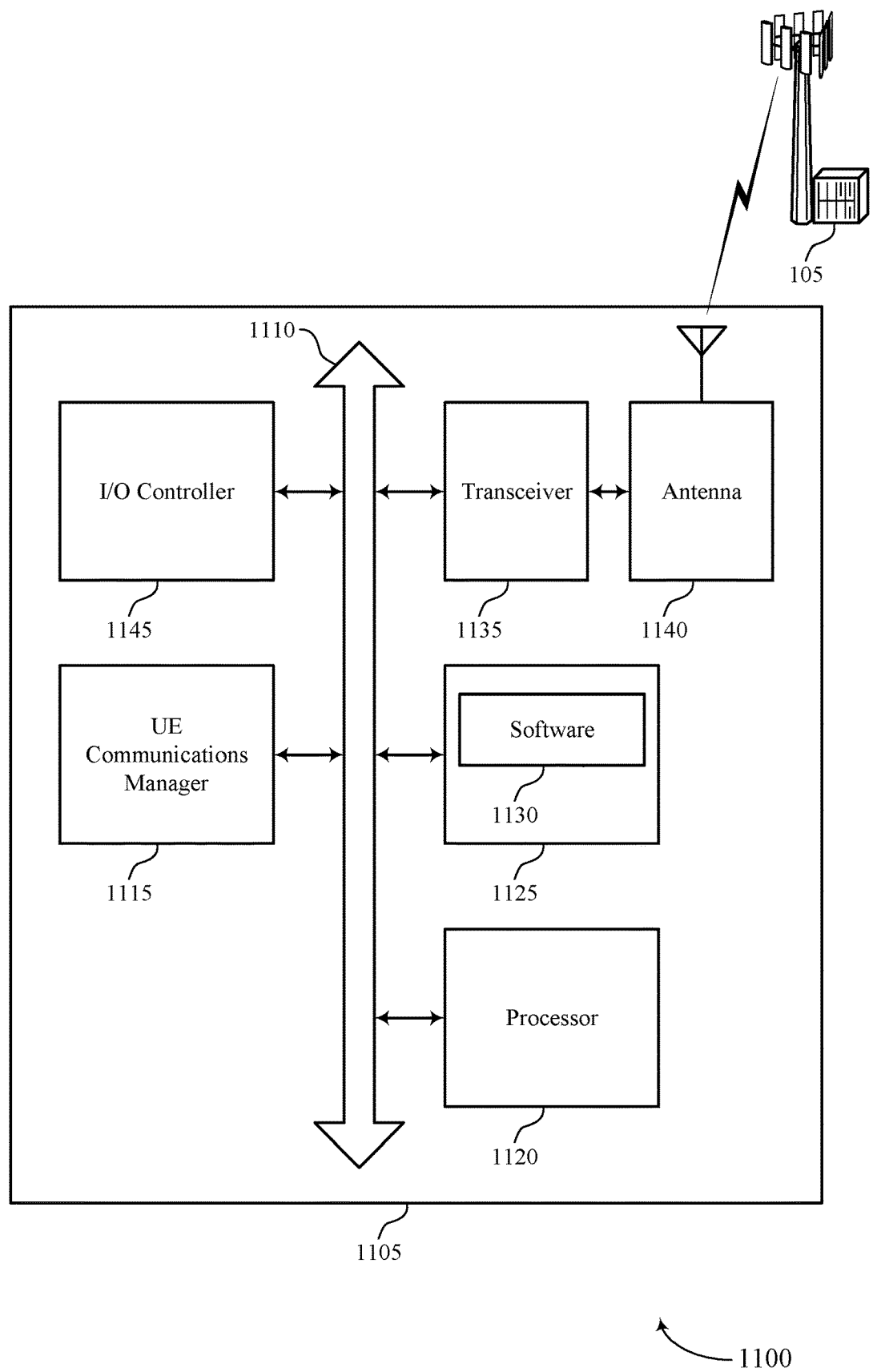
FIG. 11 illustrates a block diagram of a system including a UE that supports a reduced overhead EDC design for decoding a codeword in accordance with aspects of the present disclosure.

FIG. 11 shows a diagram of a system 1100 including a device 1105 that supports a reduced overhead error detection code design for decoding a codeword in accordance with aspects of the present disclosure. Device 1105 may be an example of or include the components of wireless device 805, wireless device 905, or a UE 115 as described herein, e.g., with reference to FIGS. 8 and 9. Device 1105 may include components for bi-directional voice and data communications including components for transmitting and receiving communications, including UE communications manager 1115, processor 1120, memory 1125, software 1130, transceiver 1135, antenna 1140, and I/O controller 1145. These components may be in electronic communication via one or more buses (e.g., bus 1110). Device 1105 may communicate wirelessly with one or more base stations 105.

Processor 1120 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1120 may be configured to operate a memory array using a memory controller. In other cases, a memory controller may be integrated into processor 1120. Processor 1120 may be configured to execute computer-readable instructions stored in a memory to perform various functions (e.g., functions or tasks supporting reduced overhead error detection code design for decoding a codeword).

Memory 1125 may include random-access memory (RAM) and read-only memory (ROM). The memory 1125 may store computer-readable, computer-executable software 1130 including instructions that, when executed, cause the processor to perform various functions described herein. In some cases, the memory 1125 may contain, among other things, a basic input/output system (BIOS) which may control basic hardware or software operation such as the interaction with peripheral components or devices.

Software 1130 may include code to implement aspects of the present disclosure, including code to support reduced overhead error detection code design for decoding a codeword. Software 1130 may be stored in a non-transitory computer-readable medium such as system memory or other memory. In some cases, the software 1130 may not be directly executable by the processor but may cause a computer (e.g., when compiled and executed) to perform functions described herein.

Transceiver 1135 may communicate bi-directionally, via one or more antennas, wired, or wireless links as described herein. For example, the transceiver 1135 may represent a wireless transceiver and may communicate bi-directionally with another wireless transceiver. The transceiver 1135 may also include a modem to modulate the packets and provide the modulated packets to the antennas for transmission, and to demodulate packets received from the antennas.

In some cases, the device 1105 may include a single antenna 1140. However, in some cases the device 1105 may have more than one antenna 1140, which may be capable of concurrently transmitting or receiving multiple wireless transmissions.

I/O controller 1145 may manage input and output signals for device 1105. I/O controller 1145 may also manage peripherals not integrated into device 1105. In some cases, I/O controller 1145 may represent a physical connection or port to an external peripheral. In some cases, I/O controller 1145 may utilize an operating system such as iOS®, ANDROID®, MS-DOS®, MS-WINDOWS®, OS/2®, UNIX®, LINUX®, or another known operating system. In other cases, I/O controller 1145 may represent or interact with a modem, a keyboard, a mouse, a touchscreen, or a similar device. In some cases, I/O controller 1145 may be implemented as part of a processor. In some cases, a user may interact with device 1105 via I/O controller 1145 or via hardware components controlled by I/O controller 1145.

Figure 12:
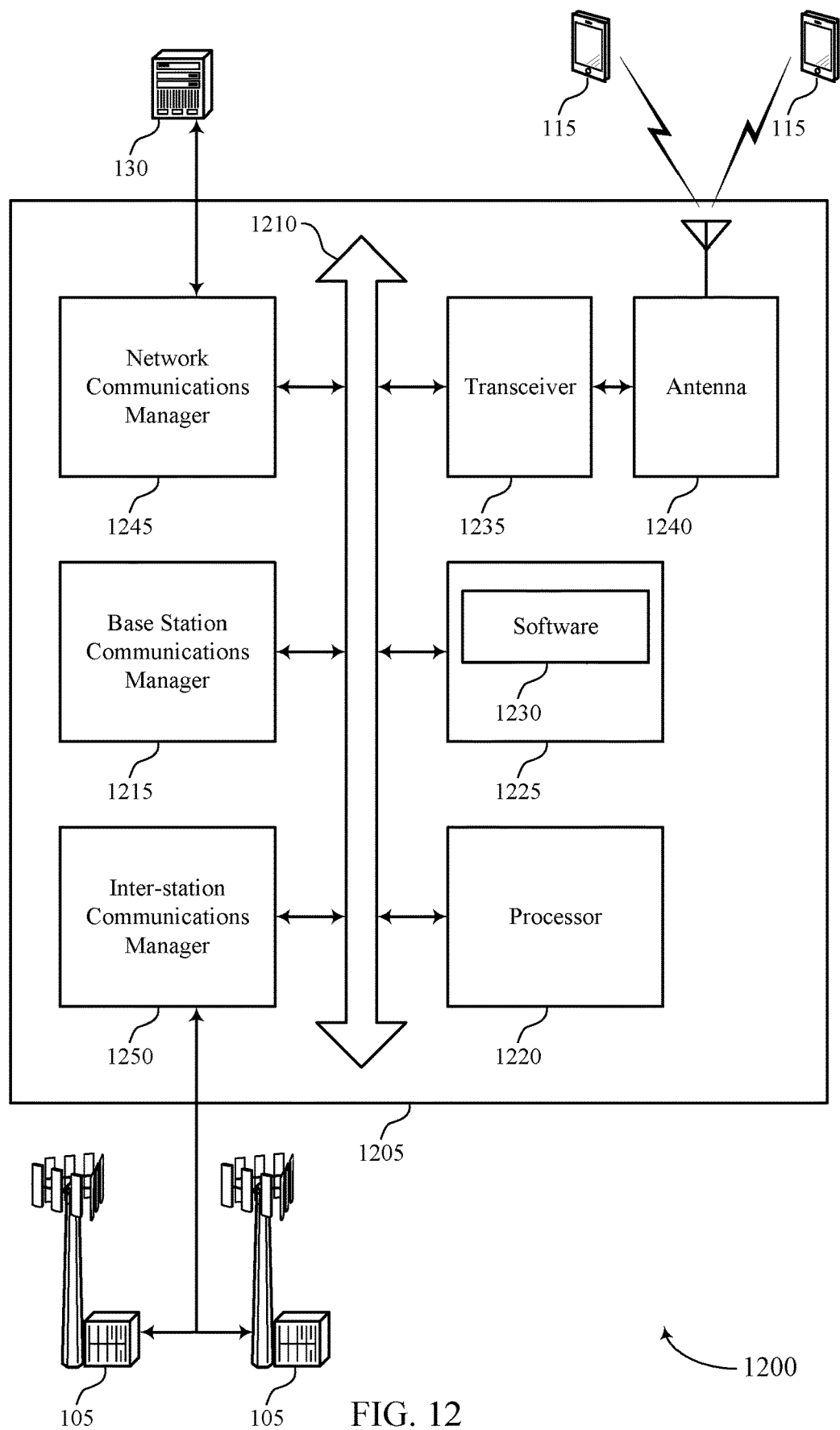
FIG. 12 illustrates a block diagram of a system including a base station that supports a reduced overhead EDC design for decoding a codeword in accordance with aspects of the present disclosure.

FIG. 12 shows a diagram of a system 1200 including a device 1205 that supports a reduced overhead error detection code design for decoding a codeword in accordance with aspects of the present disclosure. Device 1205 may be an example of or include the components of wireless device 905, wireless device 1005, or a base station 105 as described herein, e.g., with reference to FIGS. 9 and 10. Device 1205 may include components for bi-directional voice and data communications including components for transmitting and receiving communications, including base station communications manager 1215, processor 1220, memory 1225, software 1230, transceiver 1235, antenna 1240, network communications manager 1245, and inter-station communications manager 1250. These components may be in electronic communication via one or more buses (e.g., bus 1210). Device 1205 may communicate wirelessly with one or more UEs 115.

Processor 1220 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1220 may be configured to operate a memory array using a memory controller. In other cases, a memory controller may be integrated into processor 1220. Processor 1220 may be configured to execute computer-readable instructions stored in a memory to perform various functions (e.g., functions or tasks supporting reduced overhead error detection code design for decoding a codeword).

Memory 1225 may include RAM and ROM. The memory 1225 may store computer-readable, computer-executable software 1230 including instructions that, when executed, cause the processor to perform various functions described herein. In some cases, the memory 1225 may contain, among other things, a BIOS which may control basic hardware or software operation such as the interaction with peripheral components or devices.

Software 1230 may include code to implement aspects of the present disclosure, including code to support reduced overhead error detection code design for decoding a codeword. Software 1230 may be stored in a non-transitory computer-readable medium such as system memory or other memory. In some cases, the software 1230 may not be directly executable by the processor but may cause a computer (e.g., when compiled and executed) to perform functions described herein.

Transceiver 1235 may communicate bi-directionally, via one or more antennas, wired, or wireless links as described herein. For example, the transceiver 1235 may represent a wireless transceiver and may communicate bi-directionally with another wireless transceiver. The transceiver 1235 may also include a modem to modulate the packets and provide the modulated packets to the antennas for transmission, and to demodulate packets received from the antennas.

In some cases, the device 1205 may include a single antenna 1240. However, in some cases the device 1205 may have more than one antenna 1240, which may be capable of concurrently transmitting or receiving multiple wireless transmissions.

Network communications manager 1245 may manage communications with the core network (e.g., via one or more wired backhaul links). For example, the network communications manager 1245 may manage the transfer of data communications for client devices, such as one or more UEs 115.

Inter-station communications manager 1250 may manage communications with other base station 105, and may include a controller or scheduler for controlling communications with UEs 115 in cooperation with other base stations 105. For example, the inter-station communications manager 1250 may coordinate scheduling for transmissions to UEs 115 for various interference mitigation techniques such as beamforming or joint transmission. In some examples, inter-station communications manager 1250 may provide an X2 interface within an LTE/LTE-A wireless communication network technology to provide communication between base stations 105.

Figure 13:
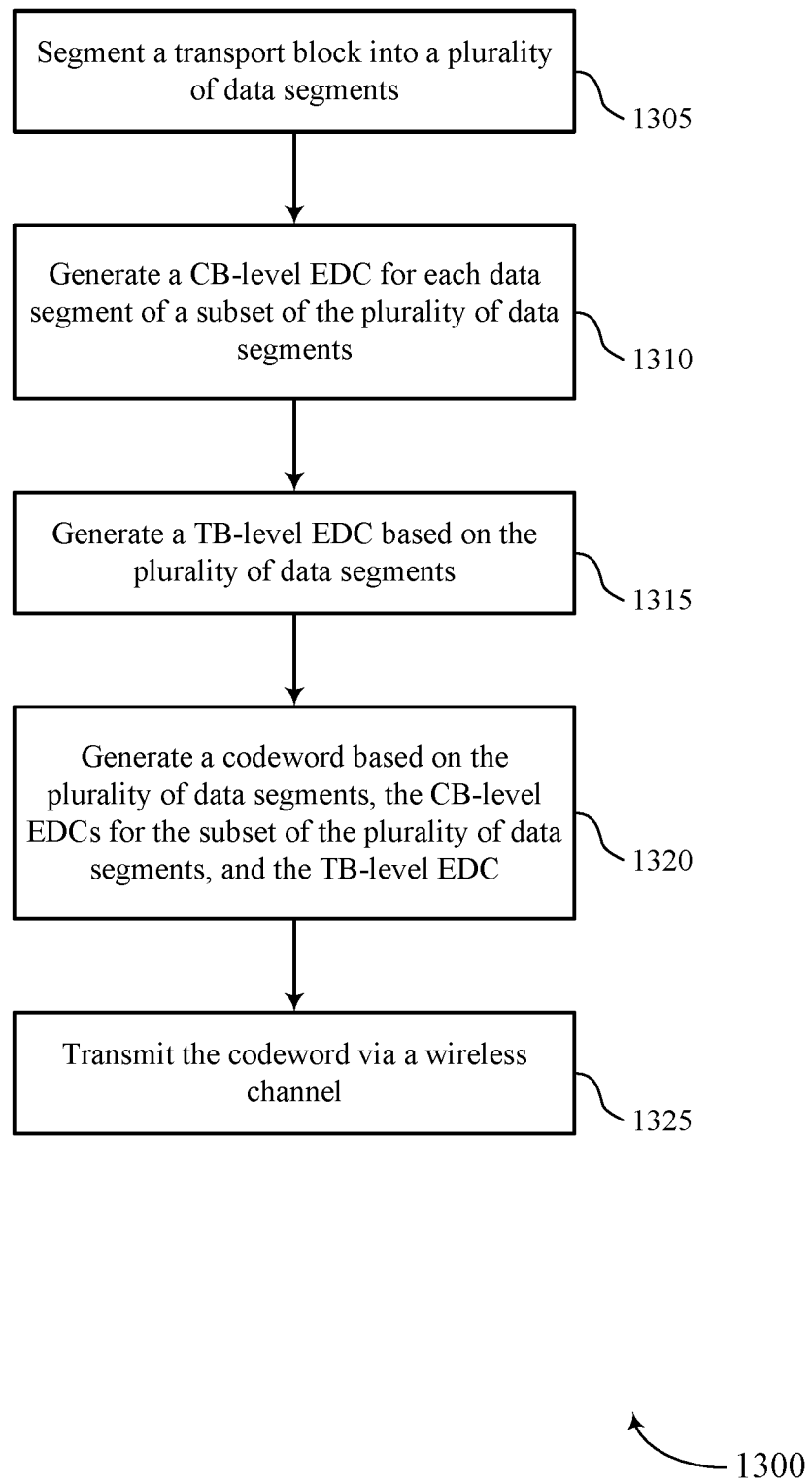
FIGS. 13 through 17 illustrate methods for reduced overhead EDC design for decoding a codeword in accordance with aspects of the present disclosure.

FIG. 13 shows a flowchart illustrating a method 1300 for reduced overhead error detection code design for decoding a codeword in accordance with aspects of the present disclosure. The operations of method 1300 may be implemented by a UE 115 or base station 105 or its components as described herein. For example, the operations of method 1300 may be performed by a communications manager 815, 915, and 1015 as described with reference to FIGS. 8 through 10. In some examples, a UE 115 or base station 105 may execute a set of codes to control the functional elements of the device to perform the functions described herein. Additionally or alternatively, the UE 115 or base station 105 may perform aspects of the functions described herein using special-purpose hardware.

At 1305, the UE 115 or base station 105 may segment a TB into a plurality of data segments. The operations of 1305 may be performed according to the methods described herein. In certain examples, aspects of the operations of 1305 may be performed by a segmentor as described with reference to FIGS. 8 through 10.

At 1310, the UE 115 or base station 105 may generate a CB-level EDC for each data segment of a subset of the plurality of data segments. The operations of 1310 may be performed according to the methods described herein. In certain examples, aspects of the operations of 1310 may be performed by a CB-level EDC generator as described with reference to FIGS. 8 through 10.

At 1315, the UE 115 or base station 105 may generate a TB-level EDC based at least in part on the plurality of data segments. The operations of 1315 may be performed according to the methods described herein. In certain examples, aspects of the operations of 1315 may be performed by a TB-level EDC generator as described with reference to FIGS. 8 through 10.

At 1320, the UE 115 or base station 105 may generate a codeword based at least in part on the plurality of data segments, the CB-level EDCs for the subset of the plurality of data segments, and the TB-level EDC. The operations of 1320 may be performed according to the methods described herein. In certain examples, aspects of the operations of 1320 may be performed by a codeword generator as described with reference to FIGS. 8 through 10.

At 1325, the UE 115 or base station 105 may transmit the codeword via a wireless channel. The operations of 1325 may be performed according to the methods described herein. In certain examples, aspects of the operations of 1325 may be performed by a codeword communicator as described with reference to FIGS. 8 through 10.

Figure 14:
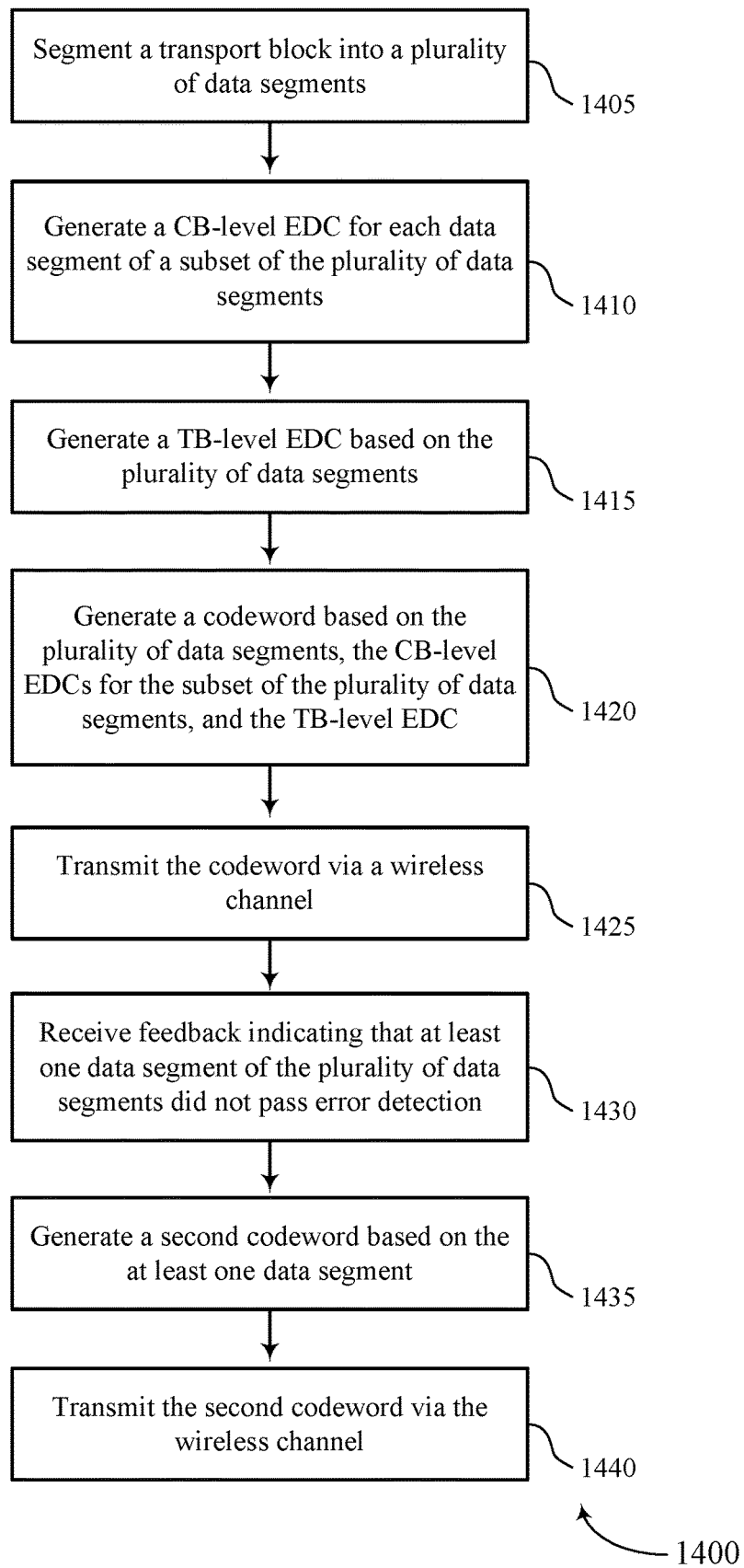

FIG. 14 shows a flowchart illustrating a method 1400 for reduced overhead error detection code design for decoding a codeword in accordance with aspects of the present disclosure. The operations of method 1400 may be implemented by a UE 115 or base station 105 or its components as described herein. For example, the operations of method 1400 may be performed by a communications manager 815, 915, and 1015 as described with reference to FIGS. 8 through 10. In some examples, a UE 115 or base station 105 may execute a set of codes to control the functional elements of the device to perform the functions described herein. Additionally or alternatively, the UE 115 or base station 105 may perform aspects of the functions described herein using special-purpose hardware.

At 1405, the UE 115 or base station 105 may segment a TB into a plurality of data segments. The operations of 1405 may be performed according to the methods described herein. In certain examples, aspects of the operations of 1405 may be performed by a segmentor as described with reference to FIGS. 8 through 10.

At 1410, the UE 115 or base station 105 may generate a CB-level EDC for each data segment of a subset of the plurality of data segments. The operations of 1410 may be performed according to the methods described herein. In certain examples, aspects of the operations of 1410 may be performed by a CB-level EDC generator as described with reference to FIGS. 8 through 10.

At 1415, the UE 115 or base station 105 may generate a TB-level EDC based at least in part on the plurality of data segments. The operations of 1415 may be performed according to the methods described herein. In certain examples, aspects of the operations of 1415 may be performed by a TB-level EDC generator as described with reference to FIGS. 8 through 10.

At 1420, the UE 115 or base station 105 may generate a codeword based at least in part on the plurality of data segments, the CB-level EDCs for the subset of the plurality of data segments, and the TB-level EDC. The operations of 1420 may be performed according to the methods described herein. In certain examples, aspects of the operations of 1420 may be performed by a codeword generator as described with reference to FIGS. 8 through 10.

At 1425, the UE 115 or base station 105 may transmit the codeword via a wireless channel. The operations of 1425 may be performed according to the methods described herein. In certain examples, aspects of the operations of 1425 may be performed by a codeword communicator as described with reference to FIGS. 8 through 10.

At 1430, the UE 115 or base station 105 may receive feedback indicating that at least one data segment of the plurality of data segments did not pass error detection. The operations of 1430 may be performed according to the methods described herein. In certain examples, aspects of the operations of 1430 may be performed by a feedback responder as described with reference to FIGS. 8 through 10.

At 1435 the UE 115 or base station 105 may generate a second codeword based at least in part on the at least one data segment. The operations of 1435 may be performed according to the methods described herein. In certain examples, aspects of the operations of 1435 may be performed by a feedback responder as described with reference to FIGS. 8 through 10.

At 1440 the UE 115 or base station 105 may transmit the second codeword via the wireless channel. The operations of 1440 may be performed according to the methods described herein. In certain examples, aspects of the operations of 1440 may be performed by a feedback responder as described with reference to FIGS. 8 through 10.

Figure 15:
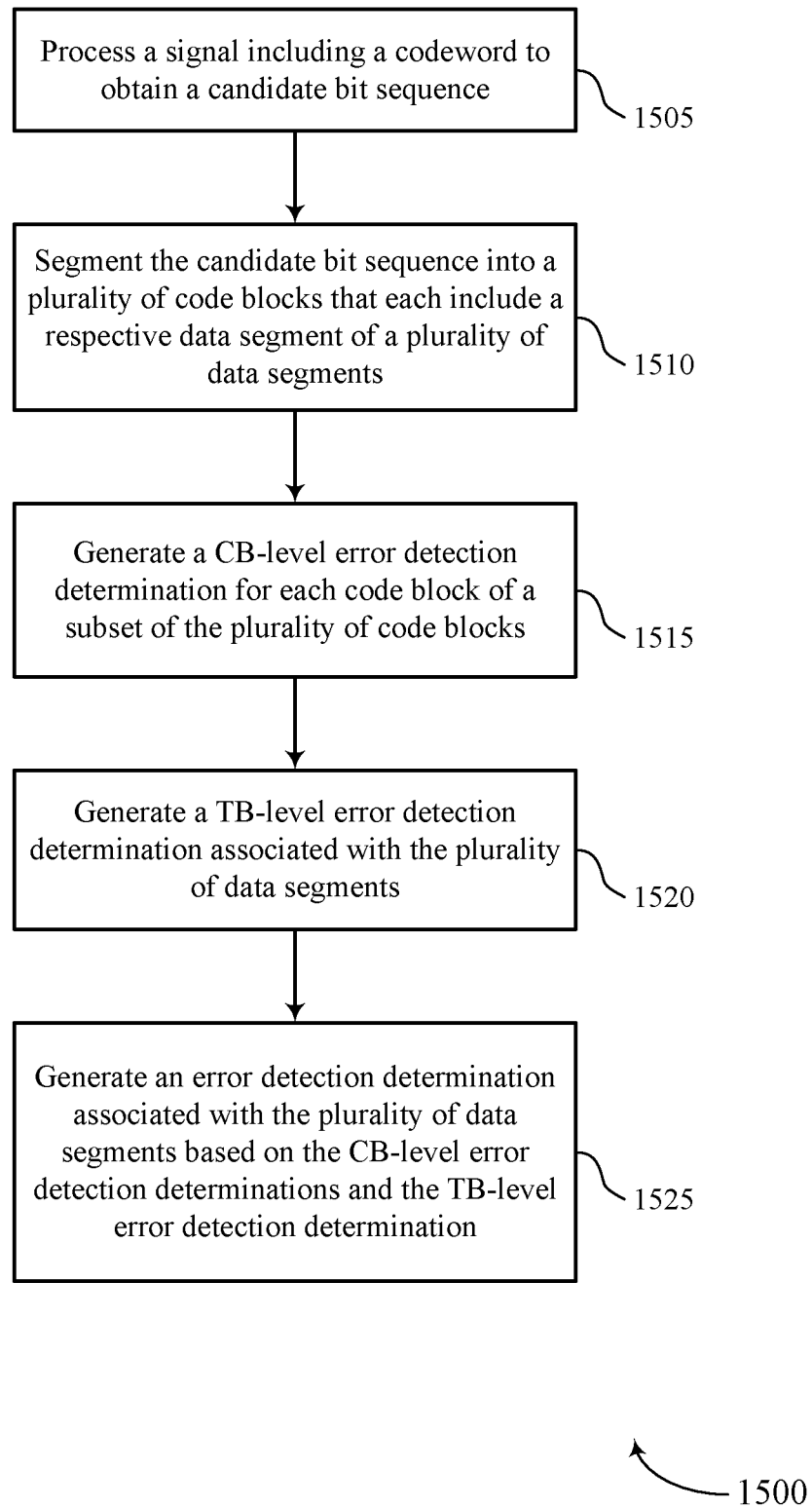

FIG. 15 shows a flowchart illustrating a method 1500 for reduced overhead error detection code design for decoding a codeword in accordance with aspects of the present disclosure. The operations of method 1500 may be implemented by a UE 115 or base station 105 or its components as described herein. For example, the operations of method 1500 may be performed by a communications manager 815, 915, and 1015 as described with reference to FIGS. 8 through 10. In some examples, a UE 115 or base station 105 may execute a set of codes to control the functional elements of the device to perform the functions described herein. Additionally or alternatively, the UE 115 or base station 105 may perform aspects of the functions described herein using special-purpose hardware.

At 1505, the UE 115 or base station 105 may process a signal including a codeword to obtain a candidate bit sequence. The operations of 1505 may be performed according to the methods described herein. In certain examples, aspects of the operations of 1505 may be performed by a candidate bit sequence identifier as described with reference to FIGS. 8 through 10.

At 1510, the UE 115 or base station 105 may segment the candidate bit sequence into a plurality of CBs that each include a respective data segment of a plurality of data segments. The operations of 1510 may be performed according to the methods described herein. In certain examples, aspects of the operations of 1510 may be performed by a candidate bit sequence segmentor as described with reference to FIGS. 8 through 10.

At 1515, the UE 115 or base station 105 may generate a CB-level error detection determination for each CB of a subset of the plurality of CBs. The operations of 1515 may be performed according to the methods described herein. In certain examples, aspects of the operations of 1515 may be performed by a CB-level error detector as described with reference to FIGS. 8 through 10.

At 1520, the UE 115 or base station 105 may generate a TB-level error detection determination associated with the plurality of data segments. The operations of 1520 may be performed according to the methods described herein. In certain examples, aspects of the operations of 1520 may be performed by a TB-level error detector as described with reference to FIGS. 8 through 10.

At 1525, the UE 115 or base station 105 may generate an error detection determination associated with the plurality of data segments based at least in part on the CB-level error detection determinations and the TB-level error detection determination. The operations of 1525 may be performed according to the methods described herein. In certain examples, aspects of the operations of 1525 may be performed by a data segment error detector as described with reference to FIGS. 8 through 10.

Figure 16:
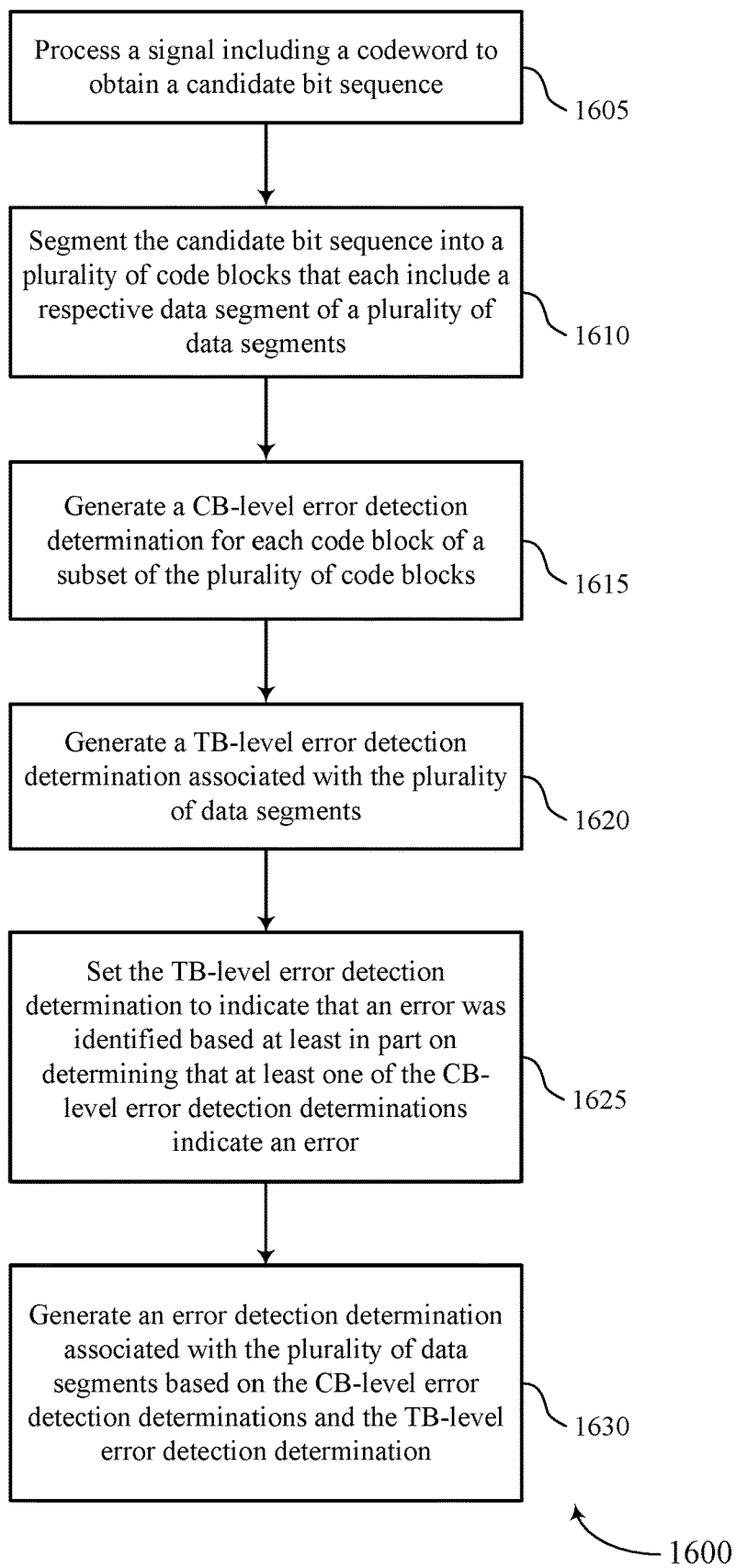

FIG. 16 shows a flowchart illustrating a method 1600 for reduced overhead error detection code design for decoding a codeword in accordance with aspects of the present disclosure. The operations of method 1600 may be implemented by a UE 115 or base station 105 or its components as described herein. For example, the operations of method 1600 may be performed by a communications manager 815, 915, and 1015 as described with reference to FIGS. 8 through 10. In some examples, a UE 115 or base station 105 may execute a set of codes to control the functional elements of the device to perform the functions described herein. Additionally or alternatively, the UE 115 or base station 105 may perform aspects of the functions described herein using special-purpose hardware.

At 1605, the UE 115 or base station 105 may process a signal including a codeword to obtain a candidate bit sequence. The operations of 1605 may be performed according to the methods described herein. In certain examples, aspects of the operations of 1605 may be performed by a candidate bit sequence identifier as described with reference to FIGS. 8 through 10.

At 1610, the UE 115 or base station 105 may segment the candidate bit sequence into a plurality of CBs that each include a respective data segment of a plurality of data segments. The operations of 1610 may be performed according to the methods described herein. In certain examples, aspects of the operations of 1610 may be performed by a candidate bit sequence segmentor as described with reference to FIGS. 8 through 10.

At 1615, the UE 115 or base station 105 may generate a CB-level error detection determination for each CB of a subset of the plurality of CBs. The operations of 1615 may be performed according to the methods described herein. In certain examples, aspects of the operations of 1615 may be performed by a CB-level error detector as described with reference to FIGS. 8 through 10.

At 1620, the UE 115 or base station 105 may generate a TB-level error detection determination associated with the plurality of data segments. The operations of 1620 may be performed according to the methods described herein. In certain examples, aspects of the operations of 1620 may be performed by a TB-level error detector as described with reference to FIGS. 8 through 10.

At 1625, the UE 115 or base station 105 may set the TB-level error detection determination to indicate that an error was identified based at least in part on determining that at least one of the CB-level error detection determinations indicate an error. The operations of 1625 may be performed according to the methods described herein. In certain examples, aspects of the operations of 1625 may be performed by a TB-level error detector as described with reference to FIGS. 8 through 10.

At 1630, the UE 115 or base station 105 may generate an error detection determination associated with the plurality of data segments based at least in part on the CB-level error detection determinations and the TB-level error detection determination. The operations of 1630 may be performed according to the methods described herein. In certain examples, aspects of the operations of 1630 may be performed by a data segment error detector as described with reference to FIGS. 8 through 10.

Figure 17:
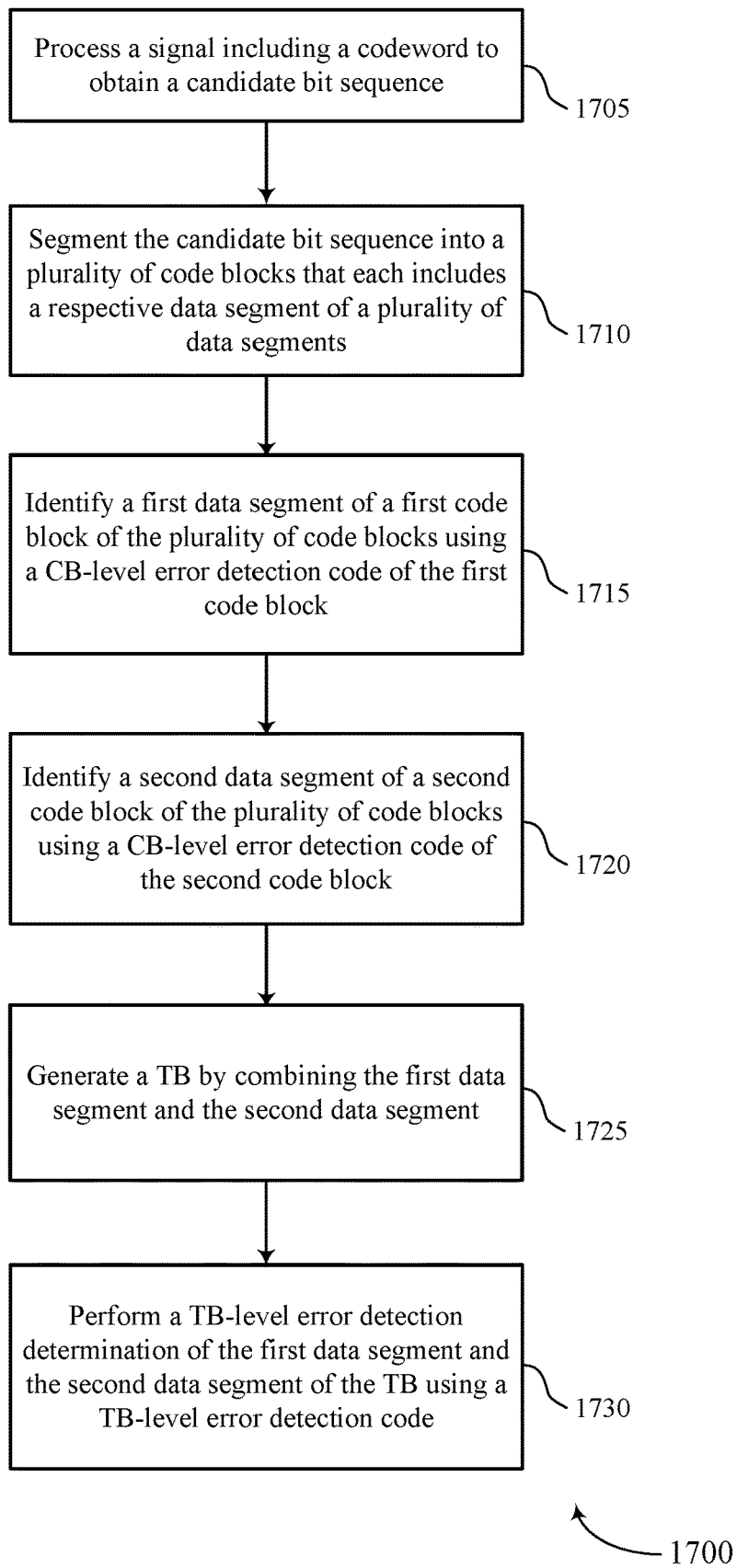

FIG. 17 shows a flowchart illustrating a method 1700 for reduced overhead error detection code design for decoding a codeword in accordance with aspects of the present disclosure. The operations of method 1700 may be implemented by a UE 115 or base station 105 or its components as described herein. For example, the operations of method 1700 may be performed by a communications manager 815, 915, and 1015 as described with reference to FIGS. 8 through 10. In some examples, a UE 115 or base station 105 may execute a set of codes to control the functional elements of the device to perform the functions described herein. Additionally or alternatively, the UE 115 or base station 105 may perform aspects of the functions described herein using special-purpose hardware.

At 1705, the UE 115 or base station 105 may process a signal including a codeword to obtain a candidate bit sequence. The operations of 1705 may be performed according to the methods described herein. In certain examples, aspects of the operations of 1705 may be performed by candidate bit sequence identifier as described with reference to FIGS. 8 through 10.

At 1710, the UE 115 or base station 105 may segment the candidate bit sequence into a plurality of CBs that each include a respective data segment of a plurality of data segments. The operations of 1710 may be performed according to the methods described herein. In certain examples, aspects of the operations of 1710 may be performed by candidate bit sequence segmentor as described with reference to FIGS. 8 through 10.

At 1715, the UE 115 or base station 105 may identify a first data segment of a first CB of the plurality of CBs using a CB-level error detection code of the first CB. In certain examples, aspects of the operations of 1715 may be performed by CB-level error detector as described with reference to FIGS. 8 through 10.

At 1720, the UE 115 or base station 105 may identify a second data segment of a second CB of the plurality of CBs using a CB-level error detection code of the second CB. The operations of 1720 may be performed according to the methods described herein. In certain examples, aspects of the operations of 1720 may be performed by CB-level error detector as described with reference to FIGS. 8 through 10.

At 1725, the UE 115 or base station 105 may generate a TB by combining the first data segment and the second data segment. The operations of 1725 may be performed according to the methods described herein. In certain examples, aspects of the operations of 1725 may be performed by TB-level error detector as described with reference to FIGS. 8 through 10.

At 1730, the UE 115 or base station 105 may perform a TB-level error detection determination of the first data segment and the second data segment of the TB using a TB-level error detection code. The operations of 1730 may be performed according to the methods described herein. In certain examples, aspects of the operations of 1730 may be performed by TB-level error detector as described with reference to FIGS. 8 through 10.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
segmenting control information into a first segment and a second segment, wherein a number of information bits of the first segment is different from a number of information bits of the second segment;
generating a first error detection code (EDC) for the first segment including a first number of error detection bits;
generating a second EDC for the second segment including a second number of error detection bits different from the first number of error detection bits;
polar encoding the first segment, the first EDC, the second segment, and the second EDC; and
transmitting a transmission based at least in part on the polar encoding via a wireless channel.

2. The method of claim 1, further comprising:
associating the first segment with a first code block; and
associating the second segment with a second code block.

3. The method of claim 2, wherein the transmission comprises the first code block, the second code block, and at least one other code block.

4. The method of claim 1, further comprising:
receiving feedback indicating whether the first segment and the second segment passed error detection; and
processing a sequence of bits included in the feedback to determine whether one or both of the first segment and the second segment passed error detection.

5. The method of claim 1, further comprising:
receiving feedback indicating that at least one segment of the first segment and the second segment did not pass error detection;
generating a second codeword based at least in part on the at least one segment; and
transmitting the second codeword via the wireless channel.

6. The method of claim 1, wherein at least one of the first EDC or the second EDC is a code block-level EDC.

7. The method of claim 1, wherein each of the first EDC and the second EDC is a cyclic redundancy check (CRC).

8. The method of claim 1, wherein the second EDC includes the second number of error detection bits and the first number of error detection bits.

9. The method of claim 1, wherein the second EDC is for the second segment and the first segment.

10. A method for wireless communication, comprising:
processing a signal comprising a codeword to obtain a candidate bit sequence;
segmenting the candidate bit sequence into a first code block and a second code block;
identifying a first segment comprising a first number of information bits of the first code block using a first error detection code (EDC) comprising a first number of error detection bits;
identifying a second segment comprising a second number of information bits different from the first number of information bits of the second code block using a second EDC comprising a second number of error detection bits different from the first number of error detection bits; and
generating control data from the first segment and the second segment.

11. The method of claim 10, further comprising:
determining that the first segment and the second segment passed error detection based at least in part on determining that error detection determinations associated with the first code block and the second code block do not indicate an error.

12. The method of claim 10, further comprising:
transmitting feedback indicating that at least one of the first segment and the second segment did not pass error detection based at least in part on error detection determinations associated with the first code block and the second code block.

13. The method of claim 10, wherein processing the signal comprising the codeword to obtain the candidate bit sequence comprises:
performing a list decoding algorithm to decode the codeword according to a polar code to generate the candidate bit sequence.

14. The method of claim 10, further comprising:
generating a first calculated EDC for the first segment;
obtaining a first received EDC from the first code block; and
comparing the first calculated EDC and the first received EDC, wherein error detection determination for the first code block indicates whether the first calculated EDC matches the first received EDC.

15. An apparatus for wireless communication, comprising:
a processor; and
memory coupled with the processor and storing instructions executable by the processor to cause the apparatus to:
segment control information into a first segment and a second segment, wherein a number of information bits of the first segment is different from a number of information bits of the second segment;
generate a first error detection code (EDC) for the first segment including a first number of error detection bits;
generate a second EDC for the second segment including a second number of error detection bits different from the first number of error detection bits;
polar encode the first segment, the first EDC, the second segment, and the second EDC; and
transmit a transmission based at least in part on the polar encoding via a wireless channel.

16. The apparatus of claim 15, wherein the instructions are further executable by the processor to cause the apparatus to:
associate the first segment with a first code block; and
associate the second segment with a second code block.

17. The apparatus of claim 16, wherein the transmission comprises the first code block, the second code block, and at least one other code block.

18. The apparatus of claim 15, wherein the instructions are further executable by the processor to cause the apparatus to:
receive feedback indicating whether the first segment and the second segment passed error detection; and
process a sequence of bits included in the feedback to determine whether one or both of the first segment and the second segment passed error detection.

19. The apparatus of claim 15, wherein the instructions are further executable by the processor to cause the apparatus to:
receive feedback indicating that at least one segment of the first segment and the second segment did not pass error detection;
generate a second codeword based at least in part on the at least one segment; and
transmit the second codeword via the wireless channel.

20. The apparatus of claim 15, wherein at least one of the first EDC or the second EDC is a code block-level EDC.

21. The apparatus of claim 15, wherein each of the first EDC and the second EDC is a cyclic redundancy check (CRC).

22. The apparatus of claim 15, wherein the second EDC includes the second number of error detection bits and the first number of error detection bits.

23. The apparatus of claim 15, wherein the second EDC is for the second segment and the first segment.

24. An apparatus for wireless communication, comprising:
a processor; and
memory coupled with the processor and storing instructions executable by the processor to cause the apparatus to:
process a signal comprising a codeword to obtain a candidate bit sequence;
segment the candidate bit sequence into a first code block and a second code block;
identify a first segment comprising a first number of information bits of the first code block using a first error detection code (EDC) comprising a first number of error detection bits;
identify a second segment comprising a second number of information bits different from the first number of information bits of the second code block using a second EDC comprising a second number of error detection bits different from the first number of error detection bits; and generate control data from the first segment and the second segment.

25. The apparatus of claim 24, wherein the instructions are further executable by the processor to cause the apparatus to:

determine that the first segment and the second segment passed error detection based at least in part on determining that error detection determinations associated with the first code block and the second code block do not indicate an error.

26. The apparatus of claim 24, wherein the instructions are further executable by the processor to cause the apparatus to:

transmit feedback indicating that at least one of the first segment and the second segment did not pass error detection based at least in part on error detection determinations associated with the first code block and the second code block.

27. The apparatus of claim 24, wherein the instructions to process the signal comprising the codeword are executable by the processor to cause the apparatus to:

perform a list decoding algorithm to decode the codeword according to a polar code to generate the candidate bit sequence.

28. The apparatus of claim 24, wherein the instructions are further executable by the processor to cause the apparatus to:

generate a first calculated EDC for the first segment;

obtain a first received EDC from the first code block; and compare the first calculated EDC and the first received EDC, wherein error detection determination for the first code block indicates whether the first calculated EDC matches the first received EDC.

* * * * *